United States Patent
Okada et al.

(10) Patent No.: US 10,262,534 B2
(45) Date of Patent: Apr. 16, 2019

(54) SYSTEM FOR AVOIDING COLLISION WITH MULTIPLE MOVING BODIES

(71) Applicant: Hitachi Automotive Systems, Ltd., Hitachinaka-shi, Ibaraki (JP)

(72) Inventors: Takashi Okada, Tokyo (JP); Mikio Ueyama, Ibaraki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 166 days.

(21) Appl. No.: 15/111,198

(22) PCT Filed: Jan. 14, 2015

(86) PCT No.: PCT/JP2015/050709
§ 371 (c)(1),
(2) Date: Jul. 13, 2016

(87) PCT Pub. No.: WO2015/136958
PCT Pub. Date: Sep. 17, 2015

(65) Prior Publication Data
US 2016/0335892 A1    Nov. 17, 2016

(30) Foreign Application Priority Data
Mar. 10, 2014  (JP) .................................. 2014-045835

(51) Int. Cl.
*G08G 1/0967* (2006.01)
*B60T 7/22* (2006.01)
(Continued)

(52) U.S. Cl.
CPC ........ *G08G 1/096725* (2013.01); *B60T 7/042* (2013.01); *B60T 7/12* (2013.01);
(Continued)

(58) Field of Classification Search
CPC .... G08G 1/096725; G08G 1/01; G08G 1/048; G08G 1/123; G08G 1/164; G08G 1/166;
(Continued)

(56) References Cited

U.S. PATENT DOCUMENTS

2009/0326796 A1* 12/2009 Prokhorov ............. G08G 1/161
701/532
2010/0030474 A1* 2/2010 Sawada .............. B62D 15/0265
701/301

(Continued)

FOREIGN PATENT DOCUMENTS

DE    10 2005 020 429 A1    11/2006
DE    10 2013 005 362 A1    10/2013
(Continued)

OTHER PUBLICATIONS

International Search Report (PCA/ISA/210) issued in PCT Application No. PCT/JP2015/050709 dated Apr. 28, 2015, with English translation (four (4) pages).

(Continued)

*Primary Examiner* — Peter D Nolan
*Assistant Examiner* — Sze-Hon Kong
(74) *Attorney, Agent, or Firm* — Crowell & Moring LLP

(57) ABSTRACT

When turning right (left) at an intersection and crossing an oncoming vehicle lane, this system makes it possible to avoid blocking travel of or colliding with a moving body moving in the oncoming vehicle lane due to stopping in the oncoming vehicle lane, and to avoid colliding with a moving body after crossing the oncoming vehicle lane. Given two or more moving bodies present in the advancement direction on the path of the local vehicle, the external environment is detected before the local vehicle intersects with the path of a first moving body, which will first intersect the local vehicle path; if at least two moving bodies are detected, i.e., (Continued)

the first moving body and a second moving body which has a path in which the position of intersection with the path of the local vehicle is further than the position of intersection between the path of the local vehicle and the path of the first moving body, then a first intersection time, at which the first position of intersection between the planned path of the local vehicle and the predicted path of the first moving body is reached, and a second intersection time, at which a second position of intersection between the planned path of the local vehicle and the predicted path of the second moving body is reached, are calculated, and on the basis of the difference between the first intersection time and the second intersection time, the deceleration relative to the first moving body and the second moving body is changed.

11 Claims, 19 Drawing Sheets

(51) Int. Cl.
| | |
|---|---|
| *G08G 1/16* | (2006.01) |
| *B60T 7/12* | (2006.01) |
| *G05D 1/02* | (2006.01) |
| *G08G 1/01* | (2006.01) |
| *G08G 1/048* | (2006.01) |
| *G08G 1/123* | (2006.01) |
| *B60T 7/04* | (2006.01) |
| *B60W 50/14* | (2012.01) |
| *B60W 10/04* | (2006.01) |
| *B60W 10/18* | (2012.01) |
| *B60W 10/20* | (2006.01) |
| *B60W 10/22* | (2006.01) |
| *B60W 30/08* | (2012.01) |
| *B60W 30/09* | (2012.01) |
| *B60W 30/095* | (2012.01) |
| *B60W 30/18* | (2012.01) |
| *B60W 40/06* | (2012.01) |

(52) U.S. Cl.
CPC ............... *B60T 7/22* (2013.01); *B60W 10/04* (2013.01); *B60W 10/18* (2013.01); *B60W 10/20* (2013.01); *B60W 10/22* (2013.01); *B60W 30/08* (2013.01); *B60W 30/09* (2013.01); *B60W 30/095* (2013.01); *B60W 30/0956* (2013.01); *B60W 30/18145* (2013.01); *B60W 40/06* (2013.01); *B60W 50/14* (2013.01); *G05D 1/021* (2013.01); *G08G 1/01* (2013.01); *G08G 1/048* (2013.01); *G08G 1/123* (2013.01); *G08G 1/164* (2013.01); *G08G 1/166* (2013.01); *B60T 2201/022* (2013.01); *B60W 2050/143* (2013.01); *B60W 2420/42* (2013.01); *B60W 2550/10* (2013.01); *B60W 2550/402* (2013.01)

(58) Field of Classification Search
CPC ... B60T 7/042; B60T 7/12; B60T 7/22; G05D 1/021; B60W 10/04; B60W 10/18; B60W 10/20; B60W 10/22; B60W 30/08; B60W 30/09; B60W 30/095; B60W 30/0956; B60W 30/018145; B60W 40/06; B60W 50/14
See application file for complete search history.

(56) References Cited

U.S. PATENT DOCUMENTS

| | | | |
|---|---|---|---|
| 2012/0206483 A1* | 8/2012 | Funabashi | G08G 1/096716 345/629 |
| 2013/0261952 A1* | 10/2013 | Aso | B60W 30/0953 701/301 |
| 2015/0035981 A1* | 2/2015 | Otsuki | G08G 1/09623 348/148 |
| 2015/0057914 A1* | 2/2015 | Hiramatsu | G08G 1/0112 701/117 |
| 2016/0114800 A1 | 4/2016 | Shimizu | |

FOREIGN PATENT DOCUMENTS

| | | |
|---|---|---|
| EP | 1 096 458 A2 | 5/2001 |
| EP | 3 023 963 A1 | 5/2016 |
| JP | 2002-326549 A | 11/2002 |
| JP | 2004-178194 A | 6/2004 |
| JP | 2005-138748 A | 6/2005 |
| JP | 2009-31968 A | 2/2009 |
| JP | 2010-33441 A | 2/2010 |
| JP | 2011-221758 A | 11/2011 |
| JP | 2012-56347 A | 3/2012 |
| JP | 2012-196997 A | 10/2012 |
| WO | WO 2014/192370 A1 | 12/2014 |

OTHER PUBLICATIONS

Partial Supplementary European Search Report issued in counterpart European Application No. 15761958.6 dated Oct. 25, 2017 (14 pages).
Chinese-language Office Action issued in counterpart Chinese Application No. 201580010303.4 dated Feb. 24, 2018 with English translation (11 pages).
English translation of Written Opinion (PCT/ISA237) issued in PCT Application No. PCT/JP2015/050709 dated Apr. 28, 2015 (11 pages).
European Search Report issued in counterpart European Application No. 15761958.6 dated Mar. 23, 2018.

* cited by examiner

FIG. 8

| INTERSECTION INFORMATION | |
|---|---|
| CENTER POSITION OF INTERSECTION (COORDINATE) | [xc, yc ] |
| INTERSECTION ANGLE | 60[deg] |
| INTERSECTION ROAD 1 | |
|     ROAD WIDTH | 10.5[m] |
|     TOTAL NUMBER OF LANES | 3 |
|     PRESENCE/ABSENCE OF RIGHT TURN LANE | PRESENCE |
|     LANE WIDTH | 3.5[m] |
|     NUMBER 1-A OF LANES ON ONE SIDE | 1 |
|     NUMBER 1-B OF LANES ON ONE SIDE | 2 |
|     MEDIAN WIDTH 1 | 0.15[m] |
|     PRESENCE/ABSENCE OF CROSSWALK | PRESENCE |
|     CROSSWALK WIDTH 1 | 3.0[m] |
|     SETBACK 1-A OF CROSSWALK | 4.5[m] |
|     SETBACK 1-B OF CROSSWALK | 1.0[m] |
| INTERSECTION ROAD 2 | |
|     ROAD WIDTH | 10.5[m] |
|     TOTAL NUMBER OF LANES | 3 |
|     PRESENCE/ABSENCE OF RIGHT TURN LANE | PRESENCE |
|     LANE WIDTH | 3.5[m] |
|     NUMBER 2-A OF LANES ON ONE SIDE | 1 |
|     NUMBER 2-B OF LANES ON ONE SIDE | 2 |
|     MEDIAN WIDTH 2 | 0.15[m] |
|     PRESENCE/ABSENCE OF CROSSWALK | PRESENCE |
|     CROSSWALK WIDTH 2 | 3.0[m] |
|     SETBACK 2-A OF CROSSWALK | 1.0[m] |
|     SETBACK 2-B OF CROSSWALK | 4.5[m] |

(A) FIRST INTERSECTION TIME − SECOND INTERSECTION TIME > PREDETERMINED VALUE
  TCP1−TCP2 ≥ Tcsf+Tpsb−ΔTv

FIG. 19

| | MAGNITUDE RELATION | DETERMINATION CONDITION |
|---|---|---|
| CASE 1 | TCP1 > TCP3 > TCP2 | TCP1 - TCP3 ≥ T13<br>TCP3 - TCP2 ≥ T32 |
| CASE 2 | TCP1 > TCP2 > TCP3 | TCP1 - TCP3 ≥ T13<br>TCP1 - TCP2 ≥ T12 |
| CASE 3 | TCP3 > TCP1 > TCP2 | TCP1 - TCP2 ≥ T12 |
| CASE 4 | TCP2 > TCP1 > TCP3 | TCP1 - TCP3 ≥ T13<br>TCP2 - TCP3 ≥ T23 |
| CASE 5 | TCP2 > TCP3 > TCP1 | — |
| CASE 6 | TCP3 > TCP2 > TCP1 | TCP3 - TCP2 ≥ T32<br>TCP1 < 0 |

US 10,262,534 B2

SYSTEM FOR AVOIDING COLLISION WITH MULTIPLE MOVING BODIES

TECHNICAL FIELD

The present invention relates to a system for avoiding collision which is configured to avoid collision with a plurality of moving bodies and obstacles around a local vehicle, and particularly to a system for avoiding collision which is configured to, in a right/left turning scene at an intersection where a movement path of the local vehicle intersects with movement paths of the plurality of moving bodies, avoid collision with another moving body crossing a road after the local vehicle makes a right/left turn while avoiding collision with a moving body traveling in an oncoming direction of the local vehicle.

BACKGROUND ART

Conventionally, a collision avoidance or a collision reduction brake system has been applied to vehicles. There is a technique of detecting an obstacle around a local vehicle to avoid collision with the obstacle in advance. For example, in the collision avoidance brake system, the brake of the local vehicle is automatically controlled on the basis of a relative distance and a relative speed between the local vehicle and the obstacle around the local vehicle to avoid the collision with the obstacle.

Herein, in a case where the local vehicle crosses a movement path of another moving body so as to make a right turn at the intersection, and when there is a crossing pedestrian after the local vehicle crosses the oncoming vehicle lane, the local vehicle remains in the oncoming vehicle lane for the operation of the collision avoidance control with respect to the crossing pedestrian. Therefore, there is a possibility to hinder the travel of the oncoming vehicle which travels on the oncoming vehicle lane. There is disclosed in PTL 1 an example of a control device for realizing both the avoidance of the travel hindrance with respect to the oncoming vehicle on the oncoming vehicle lane and the collision avoidance with respect to the crossing pedestrian after crossing the oncoming vehicle lane.

In PTL 1, the travel hindrance and collision with respect to the oncoming vehicle is avoided while avoiding the collision with the obstacle after crossing the oncoming vehicle lane. Therefore, when the local vehicle crosses the oncoming vehicle lane, an area of the oncoming vehicle lane is estimated. The obstacle after crossing the oncoming vehicle lane is detected. A request deceleration necessary for avoiding the collision with the detected obstacle is calculated. A stop position of the local vehicle is estimated on the basis of the calculated request deceleration. It is determined whether the local vehicle is to be stopped in the area of the oncoming vehicle lane on the basis of the estimated stop position of the local vehicle and the estimated area of the oncoming vehicle lane. In a case where it is determined that the local vehicle is stopped in the area of the oncoming vehicle lane, the request deceleration of the local vehicle is corrected. In other words, in a case where the local vehicle is estimated to be stopped in the oncoming vehicle lane due to the request deceleration of the local vehicle performed to avoid the collision with the obstacle after the local vehicle crosses the oncoming vehicle lane, the request deceleration of the local vehicle for the collision avoidance is corrected. Therefore, the stopping of the local vehicle in the oncoming vehicle lane and the collision with the obstacle after crossing the oncoming vehicle lane both are avoided.

CITATION LIST

Patent Literature

PTL 1: JP 2012-56347 A

SUMMARY OF INVENTION

Technical Problem

In the content disclosed in PTL 1, in a case where the local vehicle is estimated to be stopped in the oncoming vehicle lane by the request deceleration of the local vehicle for the collision avoidance with respect to the obstacle after the local vehicle crosses the oncoming vehicle lane, the request deceleration of the local vehicle for the collision avoidance is corrected. However, in such a conventional collision avoidance device (system), in a case where there is an obstacle after crossing the oncoming vehicle at a position too close to the oncoming vehicle lane, and more specifically, in a case where there is a moving body after crossing the oncoming vehicle lane at a position in a distance shorter than the entire length of the local vehicle from the end of the road on the oncoming vehicle lane, even when the deceleration for the collision avoidance of the local vehicle with respect to the obstacle after the crossing the oncoming vehicle lane is changed, the local vehicle performs the collision avoidance after crossing the oncoming vehicle lane and thus stops ahead of the obstacle. In this case, the local vehicle inevitably stops in an area of the oncoming vehicle lane. In this way, the local vehicle necessarily stops to avoid the collision with the moving body after crossing the oncoming vehicle lane depending on a positional relation to the obstacle after crossing the oncoming vehicle lane. Therefore, there may be a difficulty for the local vehicle to stop or to stop in the area of the oncoming vehicle lane.

Regarding such a problem, the invention is made to provide a system for avoiding the collision, when the local vehicle crosses the oncoming vehicle lane, to avoid collision with a plurality of moving bodies, in which the collision with a moving body which is present after crossing the oncoming vehicle lane is avoided while avoiding the collision or not hindering the moving body from traveling on the oncoming vehicle lane which may occur when the local vehicle stops in the oncoming vehicle lane.

Solution to Problem

A system for avoiding collision with a plurality of moving bodies according to the invention detects, with respect to at least two or more moving bodies in an advancing direction on a path of a local vehicle, an external environment before the local vehicle intersects with a path of a first moving body firstly intersecting with the path of the local vehicle. In a case where at least two moving bodies, that is, the first moving body and a second moving body having a path in which a position intersecting with the travel path of the local vehicle is farther than a position where the path of the first moving body intersects with a path of the second moving body are detected, a first intersection time at which the first moving body arrives at a first intersection position where a planned path of the local vehicle intersects with a predicted path of the first moving body, and a second intersection time at which the second moving body arrives at a second intersection position where the planned path of the local vehicle intersects with the predicted path of the second moving body are calculated. Braking control with respect to the first moving body and the second moving body is changed according to a difference between the second intersection time and the first intersection time.

More specifically, when the second intersection time is equal to or more than a predetermined margin time by the first intersection time, the local vehicle is increased in deceleration ahead of a first intersection position, or stopped ahead of the first intersection position. Furthermore, a system for avoiding collision with a plurality of moving bodies according to the invention detects, when an intention of a right turn with respect to an intersection in front of the local vehicle is detected, a moving body traveling on an oncoming vehicle lane and a moving body crossing a road after making a right turn. A first intersection time when the moving body in the oncoming vehicle lane having a possibility to intersect with a right path of the local vehicle arrives at an intersection position where the moving body intersects with the right turn path of the subject body, and a second intersection time when the moving body crossing after making a right turn having a possibility to intersect with the right turn path of the local vehicle are output. Braking control with respect to the moving body in the oncoming vehicle lane and the moving body crossing after making a right turn is changed according to a difference between the first intersection time and the second intersection time.

Advantageous Effects of Invention

A system for avoiding collision with a plurality of moving bodies according to the invention detects, with respect to at least two or more moving bodies in an advancing direction on a path of a local vehicle, an external environment before the local vehicle intersects with a path of a first moving body firstly intersecting with the path of the local vehicle. In a case where at least two moving bodies, that is, the first moving body and a second moving body having a path in which a position intersecting with the travel path of the local vehicle is farther than a position where the path of the first moving body intersects with a path of the second moving body are detected, a first intersection time at which the first moving body arrives at a first intersection position where a planned path of the local vehicle intersects with a predicted path of the first moving body, and a second intersection time at which the second moving body arrives at a second intersection position where the planned path of the local vehicle intersects with the predicted path of the second moving body are calculated. Braking control with respect to the first moving body and the second moving body is changed according to a difference between the second intersection time and the first intersection time. More specifically, when the second intersection time is equal to or more than a predetermined margin time by the first intersection time, the local vehicle is increased in deceleration ahead of a first intersection position, or stopped ahead of the first intersection position. Therefore, a change in behavior of the local vehicle is not predicted by performing the collision avoidance on one moving body, but on both the first moving body and the second moving body, so that the both collisions can be effectively avoided.

Specifically, a system for avoiding collision with a plurality of moving bodies according to the invention detects, when an intention of a right turn with respect to an intersection in front of the local vehicle is detected, a moving body traveling on an oncoming vehicle lane and a moving body crossing a road after making a right turn. A first intersection time when the moving body in the oncoming vehicle lane having a possibility to intersect with a right path of the local vehicle arrives at an intersection position where the moving body intersects with the right turn path of the subject body, and a second intersection time when the moving body crossing after making a right turn having a possibility to intersect with the right turn path of the local vehicle arrives at an intersection position where the moving body intersects with the right turn path of the local vehicle are output. Braking control with respect to the moving body in the oncoming vehicle lane and the moving body crossing after making a right turn is changed according to a difference between the first intersection time and the second intersection time. Therefore, in a case where the local vehicle crosses the oncoming vehicle lane to make a right turn and there is a collision possibility with a crossing pedestrian after making a right turn, the local vehicle is decelerated to avoid the collision with the crossing pedestrian, so that a condition of the collision possibility with the oncoming vehicle on the oncoming vehicle lane can be determined before making a right turn and thus the both collisions can be effectively avoided. Furthermore, in a case where there is a possibility to collide with any one of the oncoming vehicle and the crossing pedestrian when making a right turn, it is determined before making a right turn and an alarm is output. Therefore, the driver can effectively perform the collision avoidance operation.

BRIEF DESCRIPTION OF DRAWINGS

FIG. 8 is an explanatory diagram relating to an embodiment of various types of information of an intersection which is acquired by the map information acquisition means according to the invention.

FIG. 19 is a diagram illustrating determination conditions for realizing collision avoidance between three moving bodies when the local vehicle makes a right turn in a scene to which the system for avoiding collision with the plurality of moving bodies according to the invention is applied.

DESCRIPTION OF EMBODIMENTS

Figure 1:
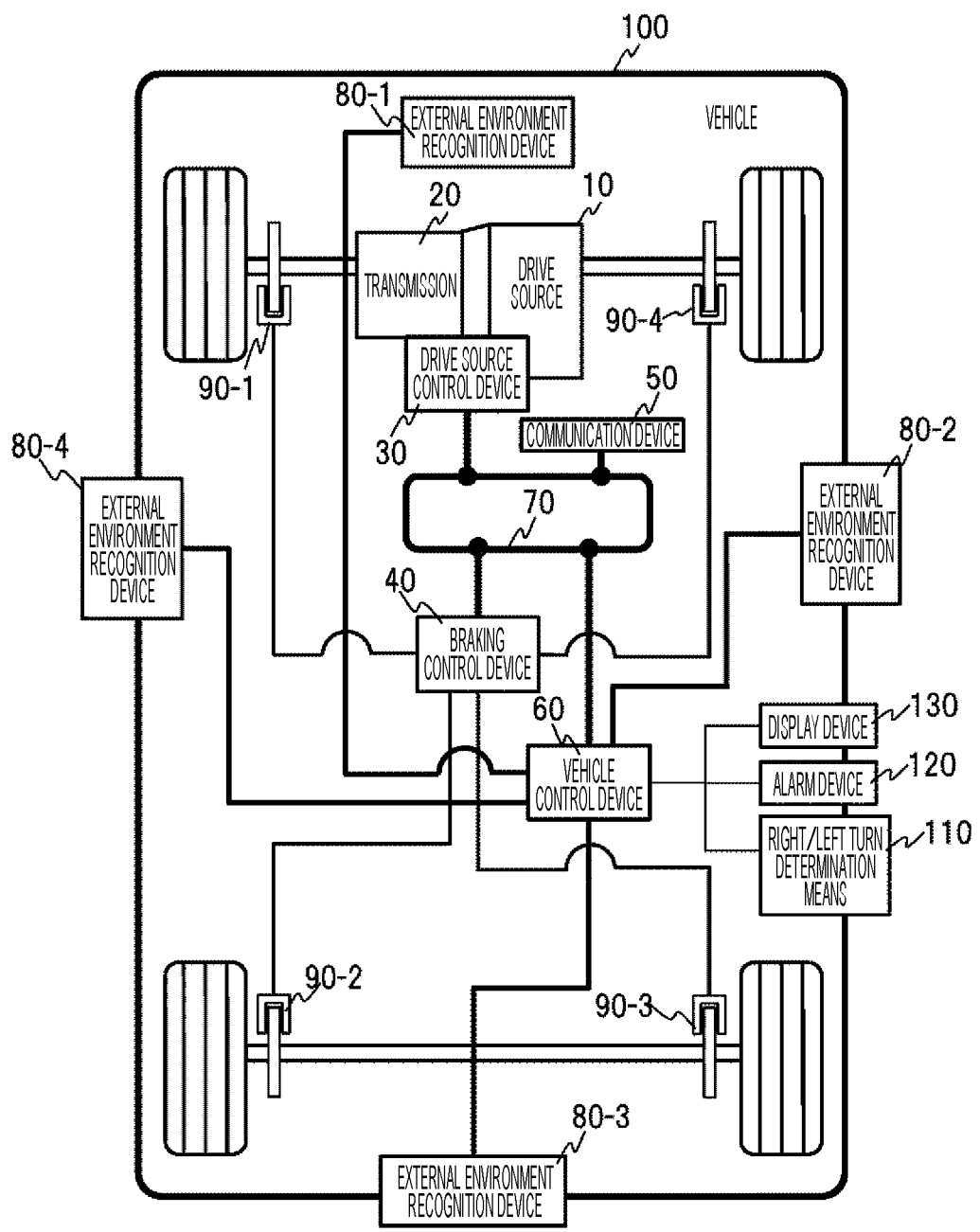
FIG. 1 is an explanatory diagram illustrating an entire configuration of an embodiment of a vehicle in which a system for avoiding collision with a plurality of moving bodies according to the invention is mounted.

FIG. 1 illustrates an outline of the entire system of a vehicle of an embodiment in which a system for avoiding collision with a plurality of moving bodies according to the invention is mounted.

In FIG. 1, a vehicle 100 with the system for avoiding collision mounted therein is illustrated in which the front side is directed on the upper side and the rear side is directed on the lower side. The vehicle 100 is provided with a drive source 10, a transmission 20 which transmits a drive force of the drive source 10, and a drive source control device 30 which controls the drive source 10, all of which are configured to drive the vehicle 100. Further, while the drive source 10 and the transmission 20 are mounted on the front side to drive tires on the front side in the example of FIG. 1, the same configuration can be applied even in the case of driving the tires on the rear side or in the case of driving all the four wheels.

Besides the drive source control device 30 for controlling the drive source 10 and the transmission 20, the vehicle 100 is mounted with a vehicle control device 60 which performs control on the entire vehicle, a communication device 50 which performs a communication with the outside, and a plurality of control devices such as a braking control device 40 which controls brake devices (90-1, 90-2, 90-3, and 90-4) provided in four-wheel tires of the vehicle 100. These components are connected to a control network 70, and communicate with information to each other. In the embodiment of FIG. 1, the vehicle control device 60 is mounted in the vehicle 100, and receives external environment information acquired by external environment recognition devices (80-1, 80-2, 80-3, and 80-4) which acquire the external environment information around the vehicle 100 and information of a vehicle status quantity (speed, yaw rate, yaw angle, longitudinal acceleration, lateral acceleration, and steering angle) indicating a status of the vehicle 100. The vehicle control device controls the vehicle 100 according to the external environment information. The vehicle status quantity indicating the status of the vehicle 100 is detected by a yaw rate sensor, an acceleration sensor, a speed sensor, and a steering sensor, which are not illustrated in FIG. 1.

In addition, there is provided a right/left turn determination means 110 which determines whether the vehicle 100 makes a right/left turn. A result on the right/left turn of the vehicle 100 determined by the right/left turn determination means 110 is transmitted to the vehicle control device 60. The right/left turn determination means 110 may determine a right/left turn of the vehicle on the basis of a result of a driver's operation on a direction indicator of the vehicle 100, or may automatically determine a right/left turn in advance when the vehicle 100 approaches a position for the right/left turn in a travel route on the basis of the travel route where the vehicle 100 travels, a determination result on a position of the vehicle 100, and map information of the travel route.

The communication device 50 is a device for transferring the communication from the outside and acquires, for example, road information (an intersection, a road width, the number of lanes, and a curve radius) in the vicinity of the travel route during traveling. Alternatively, the communication device may acquire position information of another vehicle and position information of a pedestrian in the vicinity of the travel route during traveling.

The external environment recognition device 80 (80-1, 80-2, 80-3, and 80-4) is a device for acquiring information on the external environment around the vehicle 100 (as a specific example, image information and image recognition using a camera). For the image information using the camera, there are used a monocular camera (a single camera) for recognizing the external environment and a stereo camera (two cameras) for recognizing the external environment. In the image information and the image recognition using the camera, the plurality of moving bodies (a vehicle, a pedestrian, and a light vehicle (bicycle)) around the vehicle 100 can be simultaneously recognized as the external information of the vehicle 100, and characteristics of the moving bodies can be classified. In addition, it is possible to detect a relative distance to the moving body or an obstacle around the vehicle 100 by using the stereo camera.

An alarm device 120 and a display device 130 inform a situation to a driver by presenting information such as a sound or a video in a case where there is a risk to a moving body or an obstacle around the vehicle on the basis of the external environment information obtained by the external environment recognition device 80 and the communication device 50, and the vehicle status quantity (speed, yaw rate, yaw angle, longitudinal acceleration, lateral acceleration, and steering angle) indicating a status of the vehicle 100. Alternatively, in a case where there is a risk of collision, the fact of that risk is informed to the driver when the vehicle control device 60 automatically performs control of steering and braking of the vehicle 100 before the driver performs an operation.

Figure 2:
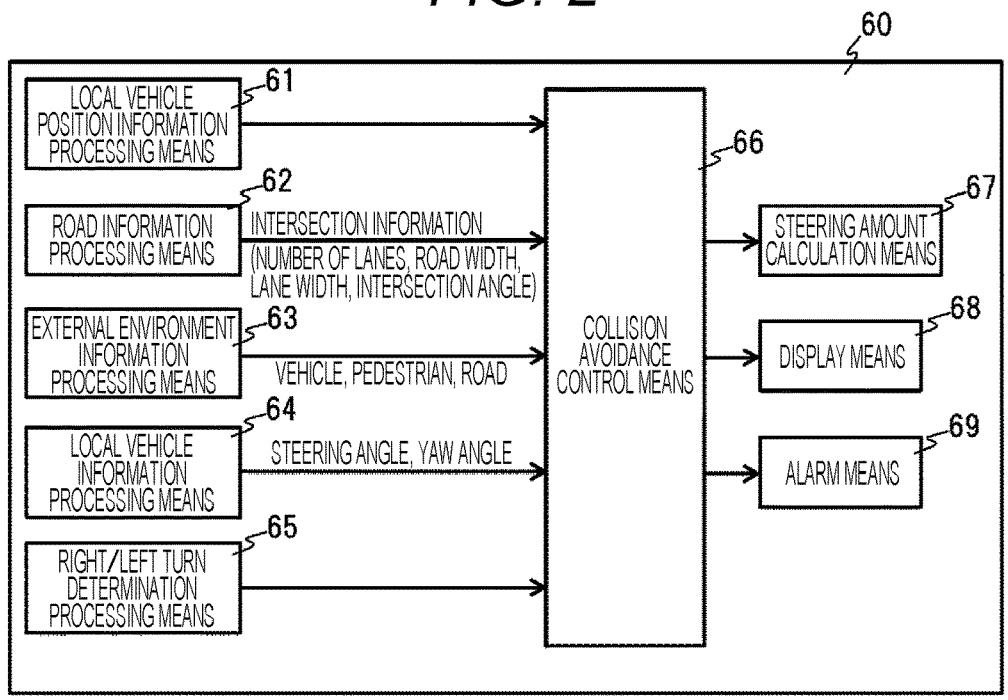
FIG. 2 is an explanatory diagram illustrating a configuration of an embodiment of a system in which the system for avoiding collision with the plurality of moving bodies according to the invention is realized.

FIG. 2 illustrates an embodiment for describing a part of the configuration of the vehicle control device 60. In the embodiment of FIG. 2, the vehicle control device 60 is configured by at least a local vehicle position information processing means 61, a road information processing means 62, an external environment information processing means 63, a local vehicle information processing means 64, a right/left turn determination processing means 65, a collision avoidance control means 66, a braking control calculation means 67, a display means 68, and an alarm means 69.

The local vehicle position information processing means 61 performs a process of specifying a position of a local vehicle 100 using a GPS. The position of the local vehicle 100 may be specified from the external environment information acquired by the external environment recognition device 80 in place of the GPS. For example, image data of the surroundings of the local vehicle 100 is acquired by the camera, and collated with an external environment image and position information stored so as to specify the position of the local vehicle 100. Alternatively, there is a method of recognizing a specific land mark in the image to specify the position of the local vehicle 100 from relative position information of the local vehicle with respect to the land mark and absolute position information of the land mark.

A road information processing means 62 acquires information on a planned travel of the local vehicle 100 from the road information around the local vehicle 100 or the map information. For example, as an embodiment of the invention, in a case where the local vehicle 100 performs a right/left turn operation at a certain intersection, there is acquired the information on the intersection where the local vehicle 100 makes a right/left turn. Examples of intersection/road information include the number of lanes of the road at the intersection, the road width, a crossing angle of the road, the number of lanes, a median width, a crosswalk width, a setback distance of the crosswalk from the intersection, and the presence/absence of a traffic signal. Such road information may be stored as one of the map information, or may be acquired as map/road information data through the communication device 50. In particular, in a case where the map/road information data is acquired from a data center through the communication device 50, the up-to-date map/road information can be effectively acquired. In addition, the road information may be acquired from, for example, the image information acquired by the external environment recognition device 80. In addition, the acquired map/road information data is utilized for specifying the position of the local vehicle 100 in the local vehicle position information processing means 61.

The external environment information processing means 63 obtains the road information around the local vehicle 100, traffic signal/sign information, position information of an obstacle, and position/speed information of a moving body from the external environment information of the surrounding environment acquired by the external environment recognition device 80 mounted in the local vehicle 100. In the external environment recognition device 80, there is employed a method of using the image data of the camera, or a method of using a laser radar or a millimeter wave radar. In a case where the image data of the camera is used, the information can be acquired by identifying the types of obstacles and moving bodies at the same time. In particular, in the case of the stereo camera using two cameras, a relative distance and a relative speed between the moving body and the obstacle can be detected and thus is advantageous.

The local vehicle information processing means 64 acquires a quantity of the operation status of the local vehicle 100. As specific examples, there are a speed, a longitudinal acceleration, a lateral acceleration, a yaw rate, a yaw angle, and a steering angle of the local vehicle 100.

The right/left turn determination processing 65 determines an intention of a right/left turn of the local vehicle 100. Specifically, it is determined whether the driver will change the local vehicle 100 to a right turn, a left turn, or another lane in front thereof on the basis of a driver's operation on a blinker (the direction indicator). In addition, in a case where a planned travel route is set by a navigation apparatus, it is also possible to determine whether the local vehicle 100 is in a situation of a right/left turn on the basis of the travel route and the position of the local vehicle 100 on the map.

The collision avoidance control means 66 determines whether there is a possibility to cause a collision with a moving body or an obstacle around the local vehicle 100 in the travel state of the local vehicle 100 using the result processed in the local vehicle position information processing means 61, the road information processing means 62, the external environment information processing means 63, the local vehicle information processing means 64, and the right/left turn determination processing means 65. In a case where there is a possibility of collision, the collision avoidance control means calculates a control command for avoiding the collision. In addition, an alarm is output to the driver before control such as the collision avoidance is performed. The control command calculated by the collision avoidance control means 66 is sent to the operation amount calculation means 67. In the operation amount calculation means 67, an operation amount of the brake device 40 for the collision avoidance of the local vehicle 100, or an operation amount of a steering device is calculated on the basis of the control command, and output. In addition, an alarm signal is output to a warning means and the display means 68 in order to call a driver's attention. Alternatively, a control content calculated for the collision avoidance is informed in advance as an alarm. Since a content of an avoidance operation and a warning are displayed for the driver, the driver is able to be effectively prompted for an appropriate preparation before the collision avoidance control means 66 performs a command for the collision avoidance.

Figure 3:
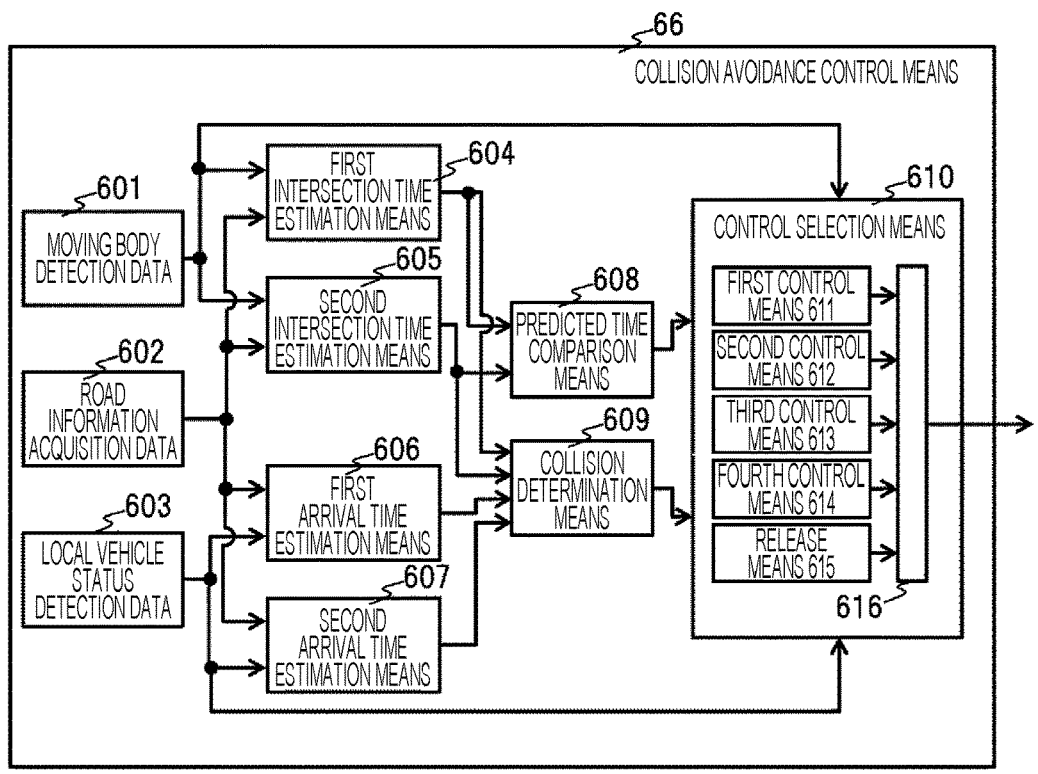
FIG. 3 is an explanatory diagram illustrating a configuration of an embodiment relating to an external environment detection means according to the invention.

FIG. 3 is an embodiment relating to a processing block of the collision avoidance control means 66 illustrated in FIG. 2.

When making a right/left turn at the intersection, the collision avoidance control means 66 determines a possibility of collision from the positions and the speeds of at least two or more moving bodies and obstacles around the local vehicle 100. In a case where there is a possibility of collision, control for the avoidance is performed. The collision avoidance control means 66 of FIG. 3 in the embodiment is configured by at least moving body detection data 601, road information acquisition data 602, local vehicle status detection data 603, a first intersection time estimation means 604, a second intersection time estimation means 605, a first arrival time estimation means 606, a second arrival time estimation means 607, a predicted time comparison means 608, a collision determination means 609, and a control select means 610.

The moving body detection data 601 is data obtained by calculating the positions and the speeds of the plurality of moving bodies and obstacles around the local vehicle 100 from the external environment information processing means 63 and the local vehicle position information means 61 on the basis of the external environment information obtained by the external environment recognition device 80. As the moving body, there are a vehicle such as an automobile, a truck, a two-wheeled vehicle, and a light vehicle (bicycle), and a pedestrian. In particular, the moving bodies and the obstacles which intersect with the travel path of the local vehicle 100 and have a possibility of collision are prioritized as high as the position intersecting with the travel path of the local vehicle 100 closes to the current position of the local vehicle 100.

The road information acquisition data 602 is data of the road/intersection information calculated by the road information processing means 62 from the information on the road at the intersection around the local vehicle 100 obtained by the communication device 50 and the external environment recognition device 80. Specifically, as the road information acquisition data, there are the number of lanes of the road, the road width, the lane width, the crossing angle of the intersection, the crosswalk width, and an offset (setback) amount of the crosswalk.

The local vehicle status detection data 603 is data indicating a status of the local vehicle 100 calculated by the local vehicle information processing means 64 from the data acquired from various types of sensors mounted in the local vehicle 100. Specifically, as the local vehicle status detection data, there are the speed, the yaw rate, the yaw angle, the longitudinal/lateral acceleration, and the steering angle of the local vehicle 100.

The first intersection time estimation means 604 acquires speed and position data of a moving body (hereinafter, referred to as a first moving body) around the local vehicle 100, of which the position intersecting with the travel path of the local vehicle 100 is closest to the current position of the local vehicle 100 on the basis of the moving body detection data 601, among the plurality of moving bodies having a possibility of collision with the travel path of the local vehicle 100. Further, the travel path of the local vehicle 100 may be generated from road/intersection data obtained by the road information acquisition data 602. For example, considering a case of making a right turn at the intersection, the local vehicle acquires the road/intersection data before entering the intersection. Assuming the oncoming vehicle as the moving body, the local vehicle 100 comes to travel on the path intersecting with the oncoming vehicle. The intersecting position at that time is on the oncoming vehicle lane in the intersection where the oncoming vehicle travels. More specifically, the path on which the local vehicle 100 makes a right turn at the intersection can be predicted and estimated from intersection data (such as a traveling speed of the local vehicle 100 at the intersection, the crossing angle of the intersection, and the number of lanes of the intersection) and a travel path on which the local vehicle 100 can travel while smoothly changing the steering angle at a lateral acceleration equal to or less than a predetermined value. Using the speed and the position data of the first moving body and data indicating a position (hereinafter, referred to as a first intersection position) at which the first moving body intersects with the travel path of the local vehicle 100, the first intersection time estimation means 604 estimates a time (hereinafter, referred to as a first intersection time) when the first moving body arrives at the first intersection position. As a method of estimating the first intersection time, there is a method of estimating the first intersection time from the current speed of the first moving body and a distance between the position of the first moving body and the first intersection position as follows.

$$TCP1=L1/V1 \qquad \text{[Expression 1]}$$

Herein, TCP1: the first intersection time [s] when the first moving body arrives at the first intersection position, L1: a distance [m] between the current position of the first moving body and the first intersection position, and V1: the current speed [m/s] of the first moving body.

The second intersection time estimation means 605 acquires the speed and the position data of a moving body (hereinafter, referred to as a second moving body) around the local vehicle 100, of which the position intersecting with the travel path of the local vehicle 100 is near in the second place to the current position of the local vehicle 100 among a plurality of moving bodies having a possibility to intersect with the travel path of the local vehicle 100 on the basis of the moving body detection data 601. For example, assuming that the first moving body is the oncoming vehicle and the second moving body is the pedestrian who crosses the road after the local vehicle 100 makes a right turn, in a case where the local vehicle makes a right turn at the intersection, the local vehicle 100 comes to travel on the path intersecting with both the oncoming vehicle and the pedestrian. The position at this time intersecting with the second moving body comes to be on the road where the pedestrian moves after the local vehicle makes a right turn. Herein, in a case where there is a crosswalk, the intersection position comes to be on the crosswalk. In this way, using the speed and the position data of the second moving body and the data indicating a position (hereinafter, referred to as a second intersection position) where the second moving body intersects with the travel path of the local vehicle 100, the second intersection time estimation means 605 estimates the time (hereinafter, referred to as a second intersection time) when the second moving body arrives at the second intersection position. As a method of estimating the second intersection time, there is a method of obtaining the second intersection time from the current speed of the second moving body and a distance between the position of the second moving body and the second intersection position as follows.

$$TCP2=L2/V2 \qquad \text{[Expression 2]}$$

Herein, TCP2: the second intersection time [s] when the second moving body arrives at the second intersection position, L2: a distance [m] between the current position of the second moving body and the second intersection position, and V2: the current speed of the second moving body [m/s].

The first arrival time estimation means 606 estimates a time (hereinafter, referred to as a first arrival time) when the local vehicle 100 arrives at the first intersection position from a status quantity of the local vehicle 100 calculated by the local vehicle status detection data 603. As a method of estimating the first arrival time, there is a method of obtaining the first arrival time from the current speed of the local vehicle 100 and a distance between the position of the local vehicle 100 and the first intersection position as follows.

$$TTP1=LO1/V0 \qquad \text{[Expression 3]}$$

Herein, TTP1: the first arrival time [s],

LO1: a distance [m] between the current position of the local vehicle and the first intersection position, and V0: the current speed [m/s] of the local vehicle.

The second arrival time estimation means 607 estimates a time (hereinafter, referred to as a second arrival time) when the local vehicle 100 arrives at the second intersection position from the status quantity of the local vehicle 100 calculated by the local vehicle status detection data 603. As a method of estimating the second arrival time, there is a method of obtaining the second arrival time from the current speed of the local vehicle 100 and a distance between the position of the local vehicle 100 and the second intersection position.

$$TTP2=LO2/V0 \qquad \text{[Expression 4]}$$

Herein, TTP2: the second arrival time [s],

LO2: a distance [m] between the current position of the local vehicle and the second intersection position, and V0: the current speed [m/s] of the local vehicle.

The predicted time comparison means 608 compares the first intersection time obtained by the first intersection time estimation means 604 with the second intersection time obtained by the second intersection time estimation means 605, determines a control method for the first moving body and the second moving body, and outputs a determination result to the control select means 610.

The collision determination means 609 performs a collision possibility determination on the first moving body and the local vehicle 100 from the first intersection time calculated by the first intersection time estimation means 604 and the first arrival time calculated by the first arrival time estimation means 606, and a collision possibility determination on the second moving body and the local vehicle 100 from the second intersection time calculated by the second intersection time estimation means 605 and the second arrival time calculated by the second arrival time estimation means 607, and then outputs the determination results to the control select means 610.

The control select means 610 selects an avoidance control method of the local vehicle 100 on the basis of the comparison result of the predicted time comparison means 608, the collision possibility determination result on the first moving body and the local vehicle 100 determined by the collision determination means 609, and the collision possibility determination result on the second moving body and the local vehicle 100 determined by the collision determination means 609. Herein, the control select means 610 includes a plurality of kinds of control, for example, controls of a first control means 611 which does not perform the collision avoidance control, a second control means 612 which performs the avoidance control on the oncoming vehicle, a third control means 613 which performs the avoidance control on the crossing pedestrian, a fourth control means which does not perform a right turn operation, and a release means 615 which releases the avoidance control selected from the first control means 611 to the fourth control means 614 in a case where there is a driver's operation on the local vehicle 100 on the basis of the local vehicle status detection data 603. Selected control is performed. The control method selected by the control select means 610 is output from the collision avoidance control means 66. Based on the control method, the operation amount calculation means 67 calculates an operation command of the avoidance control and performs the avoidance control.

While the control select means 610 has been described to select the plurality of kinds of controls in the above, an alarm may be output to the driver on the basis of a collision possibility with another moving body. For example, as a specific embodiment, the control select means includes a plurality of kinds of control of the first control means 611 which determines that there is no collision possibility and does not issue an alarm to the driver, the second control means 612 which determines that there is a collision possibility with the oncoming vehicle and issues an alarm on the collision possibility with the oncoming vehicle, the third control means 613 which determines that there is a collision possibility with the crossing pedestrian and issues an alarm on the collision possibility with the crossing pedestrian, the fourth control means which stops the local vehicle 100 because of the crossing pedestrian when making a right turn, determines that there is a collision possibility with the oncoming vehicle, and issues an alarm on the right turn operation, and the release means 615 which releases an alarm selected from the first control means 611 to the fourth control means 614 in a case where there is a driver's operation on the local vehicle 100 on the basis of the local vehicle status detection data 603. Selected control is performed. A content of the alarm selected by the control select means 610 is output from the collision avoidance control means 66. Based on the content, the alarm means 69 outputs an alarm to the driver.

While the control select means 610 has been described to select the plurality of kinds of control or the plurality of alarms in the above, an alarm may be selected at the same time with the selection of control, and the alarming to the driver may be performed at the same time with the collision avoidance control. Alternatively, the collision avoidance control may be performed after the alarming to the driver is performed.

Figure 4:
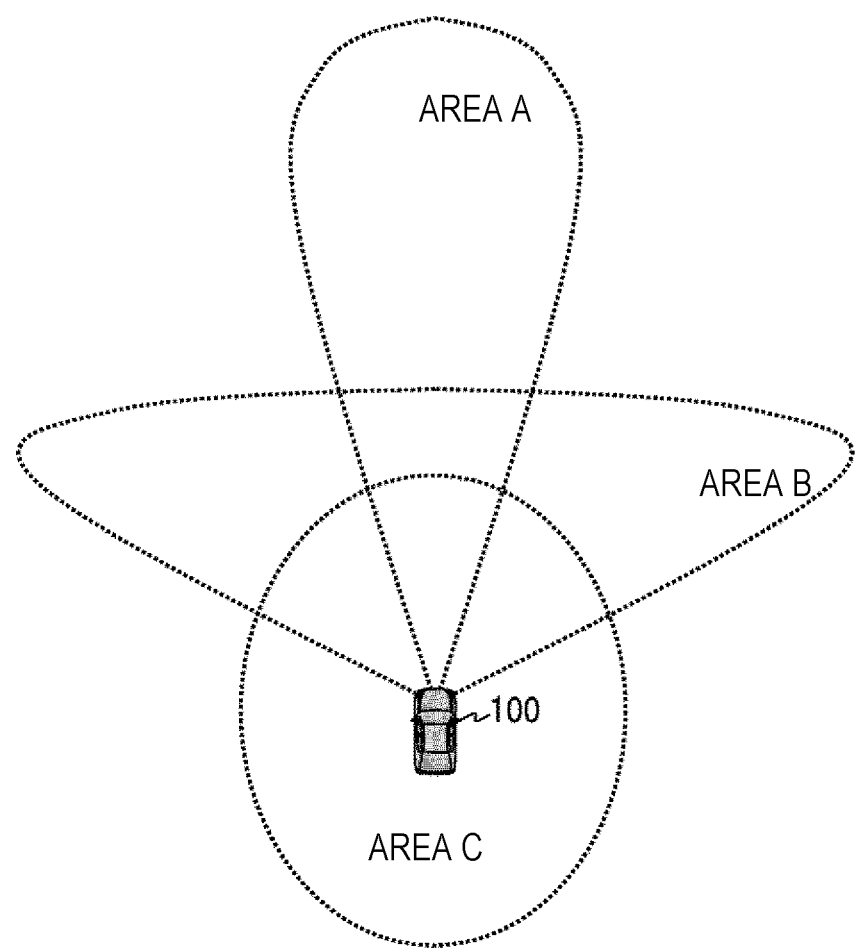
FIG. 4 is an explanatory diagram illustrating a configuration of another embodiment relating to the external environment detection means according to the invention.

FIG. 4 illustrates an external environment recognition area of the external environment recognition device 80 mounted in the local vehicle 100. In particular, FIG. 4 is an embodiment of a case where a camera is used as the external environment recognition device 80. Similarly to the embodiment of FIG. 1, the local vehicle 100 of FIG. 4 may use cameras, as the external environment recognition device 80, in the external environment recognition device 80-1 which performs an external environment recognition on the front side of the local vehicle 100, the external environment recognition device 80-2 which performs an external environment recognition on the right side of the local vehicle 100, the external environment recognition device 80-3 which performs an external environment recognition on the left side of the local vehicle 100, and the external environment recognition device 80-4 which performs an external environment recognition on the rear side of the local vehicle 100. The front side of the local vehicle 100 indicates a side in a direction where the local vehicle 100 advances. A preceding vehicle in front of the local vehicle 100, the oncoming vehicle, and the crossing pedestrian after making a right/left turn are detected. Therefore, the moving body and the obstacle in an area A illustrated in FIG. 4 are detected in order to recognize the preceding vehicle and the oncoming vehicle at a relatively remote place. Furthermore, the moving body and the obstacle in an area B illustrated in FIG. 4 are detected in order to recognize the crossing pedestrian after making a right/left turn. In this way, the front side of the vehicle is necessarily detected over an area at a wide detection angle from remote to close. Furthermore, the position and the speed of the moving body are necessarily detected with accuracy. In the example of FIG. 4, as an embodiment to realize this detection, there is mounted the external environment recognition device 80-1 in which a short-distance wide angle camera for detecting a relatively close and wide angle distance (the area B) and a long-distance camera for detecting a relatively remote distance are combined. In particular, the stereo camera and a long-distance/short-distance wide angle stereo camera are used in order to detect the distance and the speed with accuracy.

An area C of FIG. 4 is a relatively close area surrounding the entire local vehicle 100 not in the advancing direction of the local vehicle 100. Regarding the area C, there are used the external environment recognition device 80-1 which performs an external environment recognition on the front side of the local vehicle 100, the external environment recognition device 80-2 which performs an external environment recognition on the right side of the local vehicle 100, the external environment recognition device 80-3 which performs an external environment recognition on the left side of the local vehicle 100, and the external environment recognition device 80-4 which performs an external environment recognition on the rear side of the local vehicle 100, so that the detection of the entire surroundings is covered.

Figure 5:
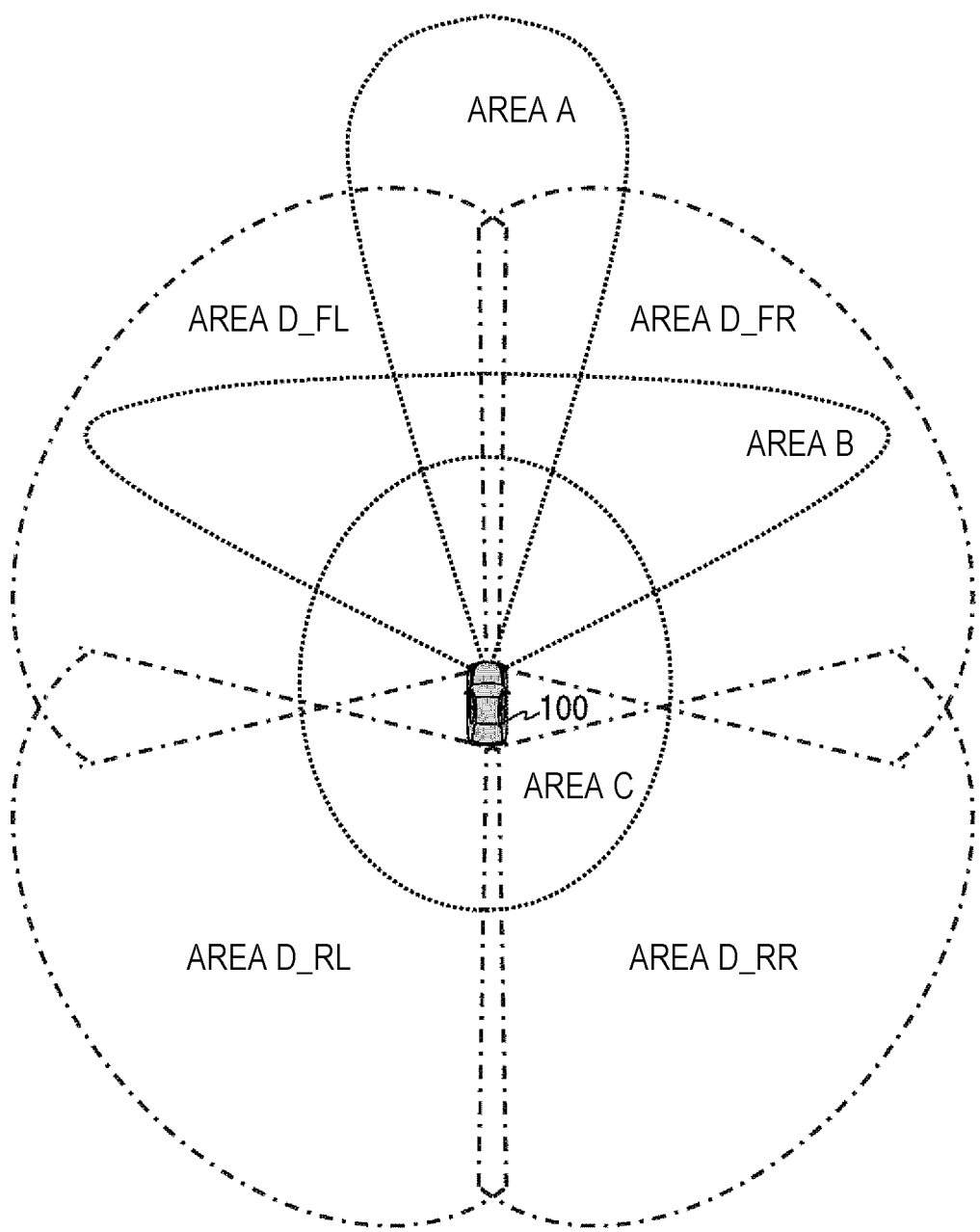
FIG. 5 is an explanatory diagram illustrating an outline of the external detection at an intersection using the external environment detection means according to the invention.

FIG. 5 illustrates another embodiment of the external environment recognition areas using the external environment recognition device 80 mounted in the local vehicle 100. In FIG. 5, the areas A, B, and C described in the embodiment of FIG. 4 are recognized using the cameras as the external environment recognition device 80. Furthermore, radar sensors different from the camera of the local vehicle 100 are mounted in the periphery of the vehicle to detect the entire surroundings of the local vehicle 100 using the radars. While the radar is difficult to identify the moving body and the obstacle, the radar can detect the distance and the speed of the moving body and the obstacle with a relatively high accuracy compared to the camera. In the embodiment of FIG. 5, four radars are mounted in the front, rear, right and left portions of the local vehicle 100 to detect the distance and the speed of the moving body and the obstacle in areas D_FL, D_FR, D_RL, and D_RR. With such a configuration, the sensors are fused to identify the moving body and the obstacle around the vehicle 100 using the cameras, and to detect the distance and the speed using the radars, so that the moving body and the obstacle can be detected with high accuracy. Furthermore, even in a scene where the camera is not usable, the speed and the position of the moving body can be detected using the radar.

The description will be made using FIG. 6 on that the local vehicle 100 recognizes the moving body and the obstacle in a case where the camera is used as the in-vehicle sensor 80 according to the embodiment illustrated in FIGS. 4 and 5.

Figure 6:
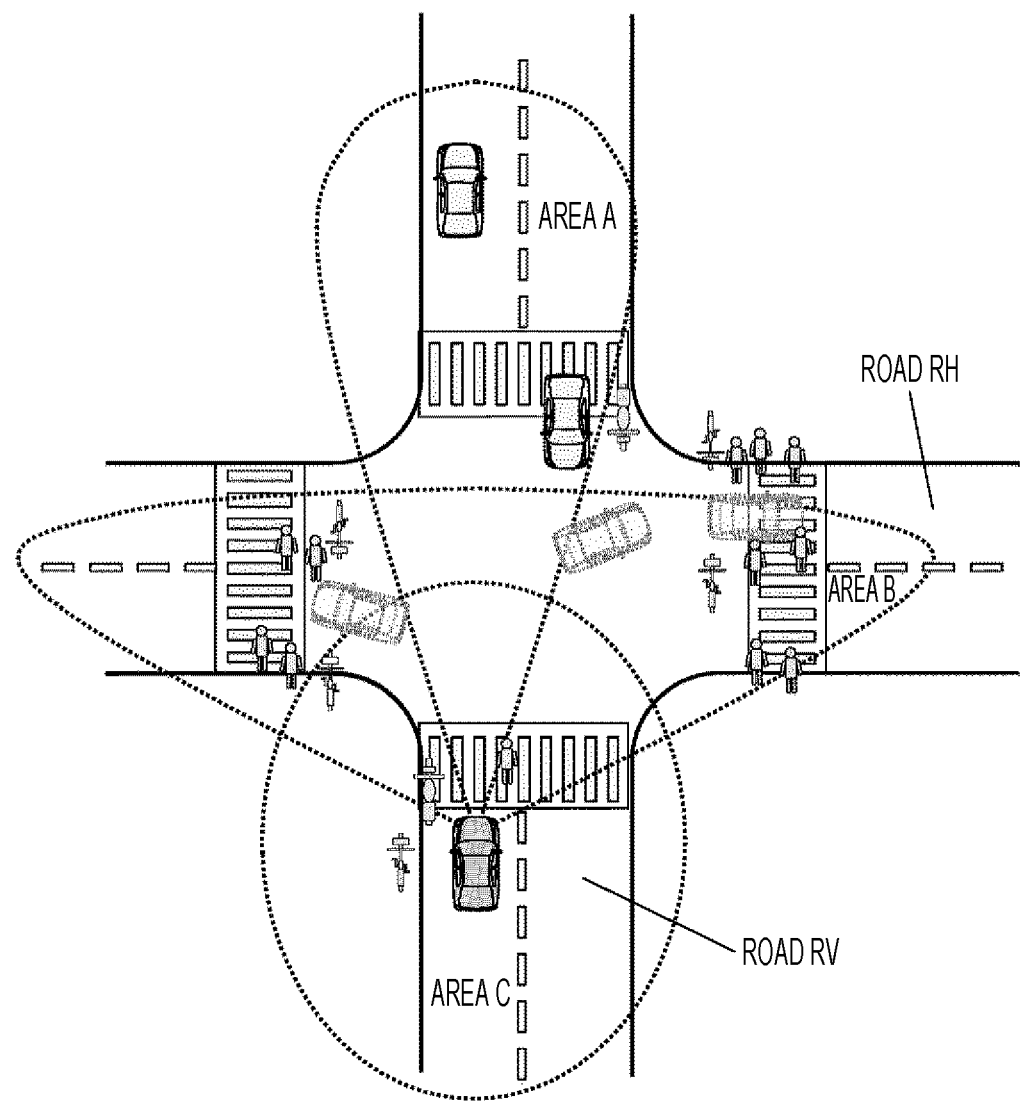
FIG. 6 is an explanatory diagram relating to the detection of other moving bodies at an intersection using the external environment detection means according to the invention.

FIG. 6 is an embodiment in a case where the camera is used as the external environment recognition device 80 as described in FIGS. 4 and 5, and illustrates a situation in which the local vehicle 100 travels on a road RV and enters the intersection. The local vehicle 100 of FIG. 6 uses the cameras in the external environment recognition device 80-1 which performs an external environment recognition on the front side of the local vehicle 100, the external environment recognition device 80-2 which performs an external environment recognition on the right side of the local vehicle 100, the external environment recognition device 80-3 which performs an external environment recognition on the left side of the local vehicle 100, and the external environment recognition device 80-4 which performs an external environment recognition on the rear side of the local vehicle 100. In an area A illustrated in FIG. 6, the moving body and the obstacle in a relatively wide place from remote to close in front of the local vehicle 100 are detected. In the example of FIG. 6, the preceding vehicle and the oncoming vehicle are detected. In addition, in an area B, the moving body and the obstacle in a wide angle place at a relatively close distance from the local vehicle 100 are detected. In the example of FIG. 6, the pedestrian and the light vehicle (bicycle) crossing a road RH intersecting with the road RV where the local vehicle 100 travels are detected. As long as the external environment information on the front side in a wide angle range can be acquired as illustrated in FIG. 6, it is possible to detect the moving body and the obstacle on the travel path of the local vehicle 100 or to detect an approaching one when the local vehicle 100 makes a right/left turn. Furthermore, in an area C, the moving body and the obstacle around the local vehicle 100 are detected. In the example of FIG. 6, the light vehicle (bicycle) and the two-wheeled vehicle on the left side of the local vehicle 100 are detected. Through the detection of the moving body and the obstacle in the vicinity of the local vehicle 100, the moving body and the obstacle having a possibility to be engaged in the local vehicle 100 when the local vehicle 100 makes a left turn can be detected.

Figure 7:
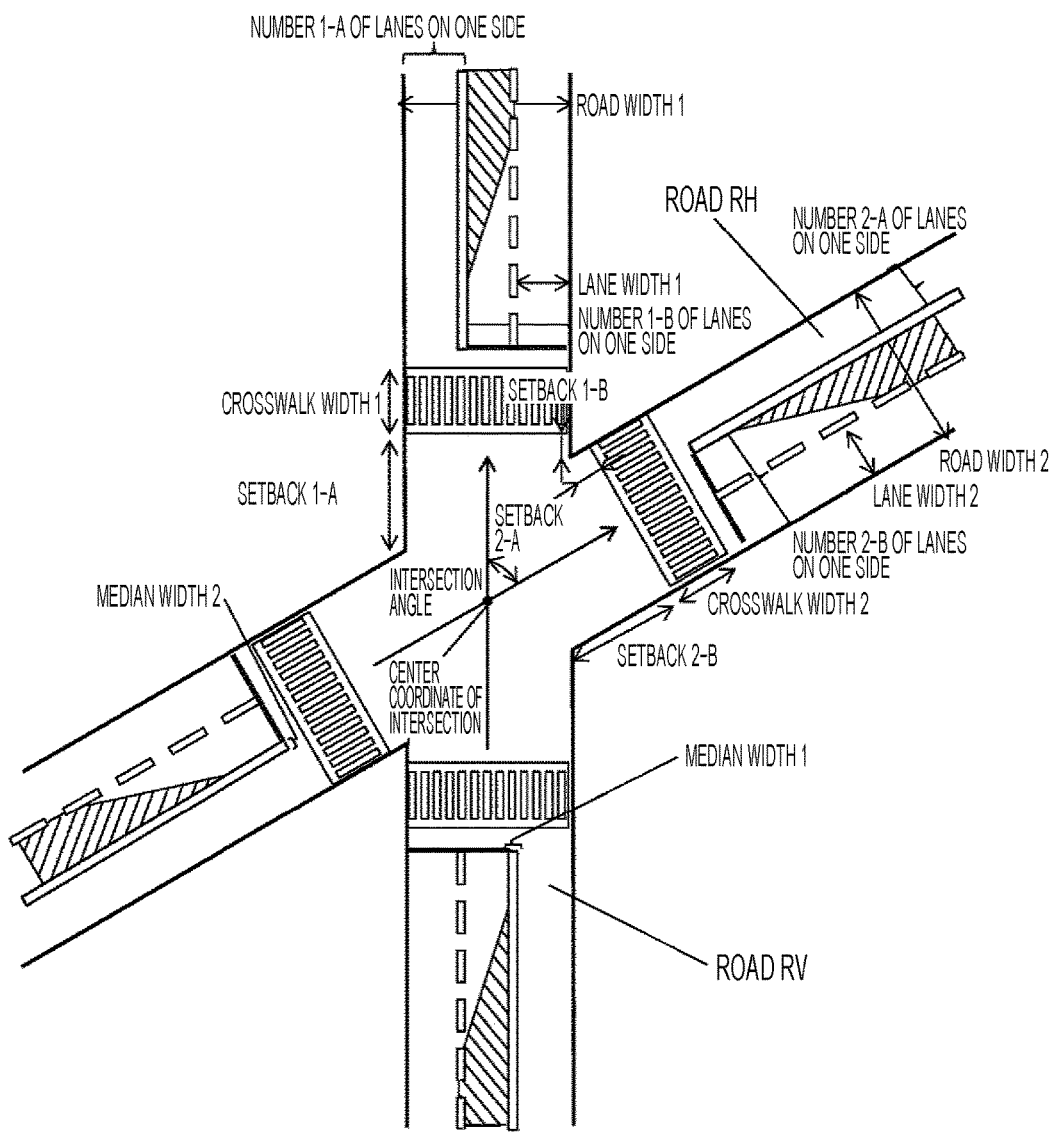
FIG. 7 is an explanatory diagram relating to an embodiment of various types of information of an intersection which is acquired by a map information acquisition means according to the invention.

The description will be made using FIG. 7 about the map/road information relating to an intersection road assumed in the embodiment of the invention. As described in FIGS. 2 and 3, the intersection/road information is used as the map/road information data in one of the embodiments of the invention. FIG. 8 illustrates the intersection/road information. FIG. 7 illustrates the road in the vicinity of the intersection where two roads (RV, RH) intersect. As the intersection/road information, there are parameters for realizing the shape of the road/intersection necessary for specifying the travel path where the local vehicle 100 travels when the local vehicle 100 makes a right/left turn at the intersection, the position and the area where the vehicle traveling on the oncoming vehicle lane intersects with the travel path of the local vehicle 100, and the position and the area where the crossing pedestrian intersects with the travel path of the local vehicle 100 after the local vehicle 100 makes a right/left turn. Examples of specific parameters of the embodiment illustrated in FIG. 7 include a central coordinate position of the intersection where the local vehicle 100 intersects with two roads, the crossing angle which is an intersection angle between two roads (RV, RH), a road width 1, the number 1-A of lanes on one side, the number 1-B of lanes on one side, a lane width 1, a median width 1, a crosswalk width 1, a crosswalk setback 1-A, and a crosswalk setback 1-B regarding one of the cross roads, and a road width 2, the number 2-A of lanes on one side, the number 2-B of lanes on one side, a lane width 2, a median width 2, a crosswalk width 2, a crosswalk setback 2-A, and a crosswalk setback 2-B regarding the other one of the cross roads. When the speed of the local vehicle 100 is determined using these numerical parameters as the intersection/road information, the travel path where the local vehicle 100 travels can be set. Furthermore, when the local vehicle 100 makes a right turn, a position where the vehicle traveling on the oncoming vehicle lane intersects with the local vehicle 100, and a position where the crossing pedestrian walking on the crosswalk intersects with the local vehicle 100 can be set. A specific example of the intersection/road information described above is illustrated in FIG. 8.

Figure 9:
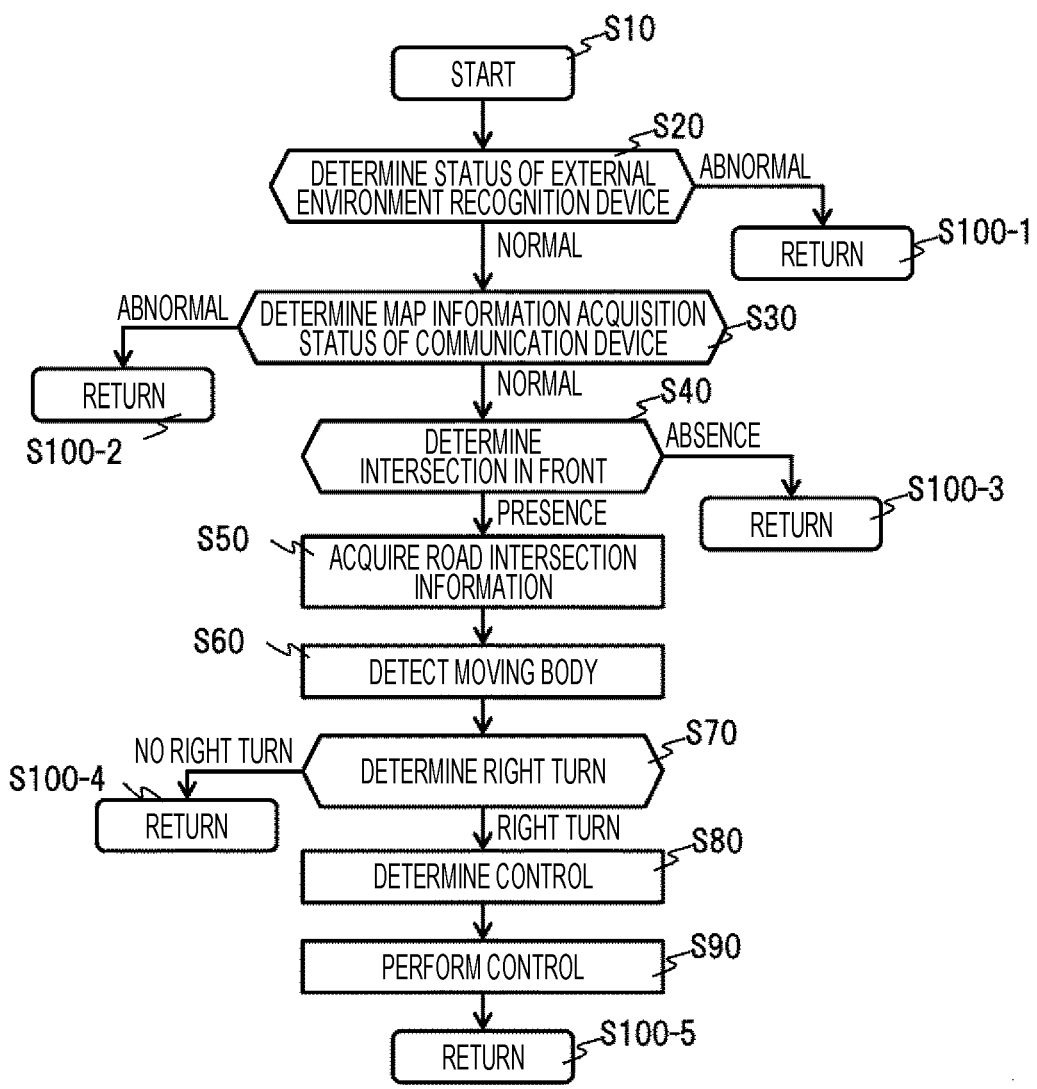
FIG. 9 is a flowchart illustrating an embodiment relating to control for avoiding collision on the basis of the external detection in the system for avoiding collision with the plurality of moving bodies according to the invention.

FIG. 9 is a diagram of an embodiment illustrating a flow of the entire process relating to the collision avoidance with respect to a plurality of moving bodies according to the invention.

First, it is determined whether the external environment recognition devices 80 illustrated in FIG. 1 are abnormal (S20). Herein, in a case where there is an abnormality in any one of the external environment recognition devices 80, it is determined that the external environment recognition device 80 is abnormal, and a collision avoidance process of the invention is not performed. In this case, the alarm device 120 and the display device 130 inform the abnormality to the driver. In a case where there is no abnormality in S20, the process proceeds to the next S30. In S30, it is determined whether the communication device 50 can acquire the road/map information around the local vehicle 100. In a case where it is not possible to acquire the information due to a communication error, the collision avoidance process of the invention is not performed. In a case where it is determined that there is no abnormality in S30, the process proceeds to the next step S40. In S40, it is determined whether there is an intersection in front of the local vehicle 100, or whether the local vehicle is in an area where a right/left turn is possible. As a case where it is determined that there is an intersection or the local vehicle is in an area where a right/left turn is possible, there is a case where the external environment recognition device 80 determines that there is an intersection or an area where a right/left turn is possible, and a case where the communication device 50 acquires information of the intersection or the area where a right/left turn is possible. As the information acquired by the communication device 50, information indicating the presence/absence of the intersection is directly acquired, or information indicating the intersection in front of the local vehicle or the area where a right/left turn is possible may be acquired through matching the position of the local vehicle 100 with the road map information which is acquired. In a case where it is determined that there is the intersection or the area where a right/left turn is possible in front of the local vehicle 100 in S40, road intersection information is acquired in S50. As the road intersection information, there are the parameters described in FIGS. 7 and 8. Next, the moving body around the local vehicle is detected by the external environment recognition device 80 (S60). Next, it is determined whether the local vehicle 100 makes a right/left turn on the basis of the intersection in front of the local vehicle 100 and the area where a right/left turn is possible, which are acquired in advance (S70). As the determination on a right/left turn, it is determined whether the driver will make a right turn or a left turn, or change the lane in front of the local vehicle 100 on the basis of a driver's operation on the blinker (the direction indicator) of the local vehicle 100 as described in the embodiment of FIG. 3. Further, in a case where the travel route is set in advance by a navigation apparatus, it is determined that the local vehicle 100 is in a situation of making a right/left turn from the travel route and the position of the local vehicle 100 on the map. Herein, when it is determined that the local vehicle 100 does not make a right/left turn, the control process of the invention is not performed. On the other hand, when a right/left turn is determined, a possibility of collision with a plurality of moving bodies is determined from the acquired information of the moving bodies and the road/intersection information, and therefore control to be performed is determined (S80). Then, specific control (braking control and steering control) of the collision avoidance is performed on the basis of a control determination of S80 (S90). Further, in S90, besides the specific control for the collision avoidance, the collision possibility with the plurality of moving bodies may be alarmed to the driver on the basis of the control determination of S80, and the collision avoidance control and the alarming to the driver may be performed at the same time or the collision avoidance control may be performed after the alarming is performed.

Figure 10:
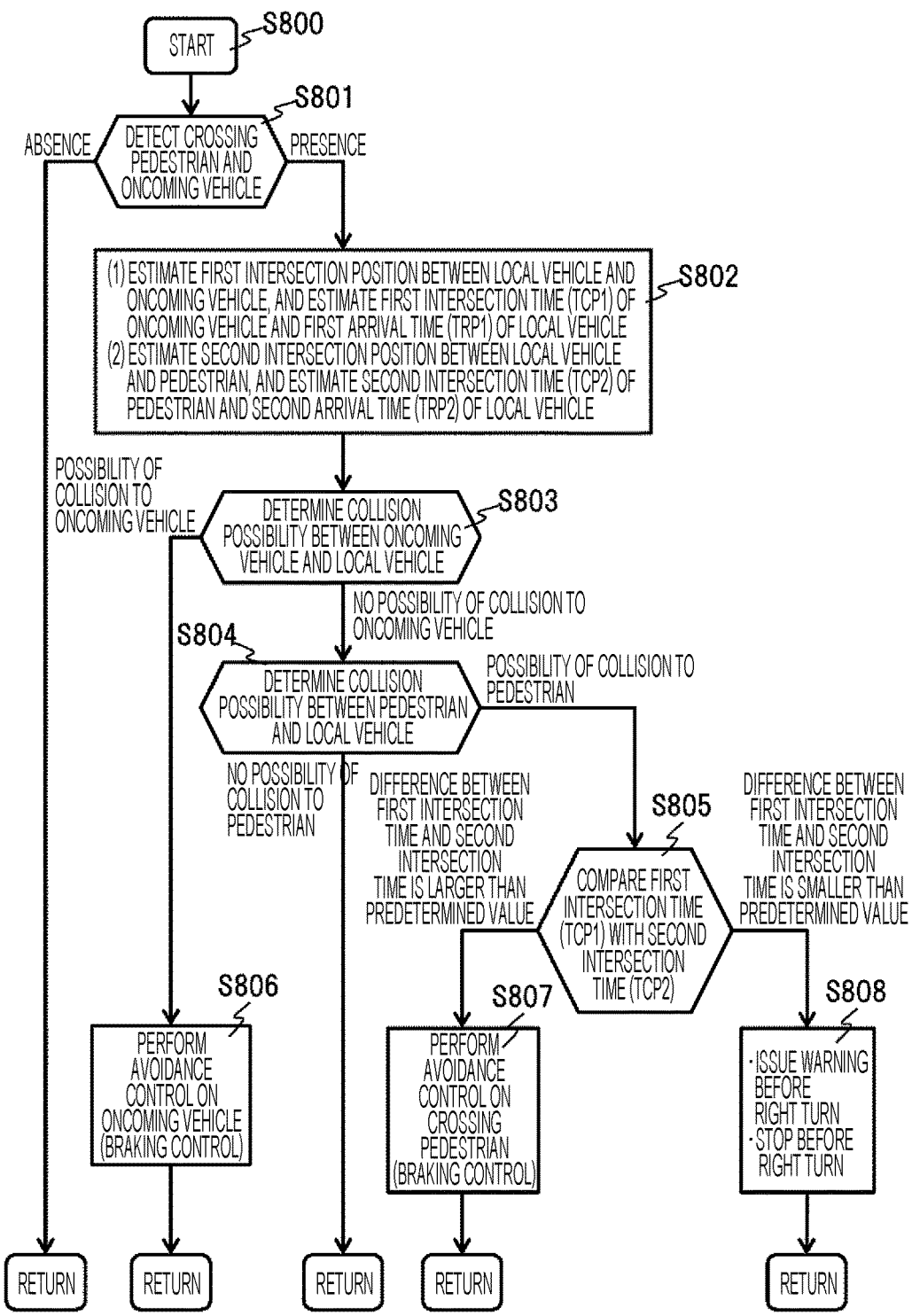
FIG. 10 is a flowchart illustrating a flowchart of an embodiment relating to a determination on collision with the plurality of moving bodies and control in the system for avoiding collision with the plurality of moving bodies according to the invention.

FIG. 10 is a diagram of an embodiment illustrating a flow of a control determination process related to the collision avoidance with respect to the plurality of moving bodies in S80 of FIG. 9. Hereinafter, the description in FIG. 10 will be made about a case where there is the oncoming vehicle on an oncoming vehicle lane of the local vehicle 100 when the local vehicle 100 makes a right turn, and a pedestrian crosses the road after the local vehicle 100 makes a right turn at the intersection.

In FIG. 10, the detection of the moving body in S60 of FIG. 9 is performed in S801. As a result, it is determined whether two moving bodies (that is, the oncoming vehicle traveling on the oncoming vehicle lane of the local vehicle 100 and the pedestrian who crosses the road after the local vehicle 100 makes a right turn at the intersection) are detected. Herein, in a case where it is detected that neither the oncoming vehicle nor the crossing pedestrian is detected, a case where only the oncoming vehicle is detected, and a case where only the crossing pedestrian is detected, the two moving bodies are not detected, and thus the process of the invention is not performed. On the other hand, in a case where the two moving bodies (the oncoming vehicle and the crossing pedestrian) are detected, the process proceeds to the next step S802.

In S802, the first intersection position between the local vehicle 100 and the oncoming vehicle is set. The first intersection time (TCP1) of the oncoming vehicle is calculated as described in (Expression 1), and the first arrival time (TTP1) of the local vehicle 100 is calculated as described in (Expression 3). In addition, the second intersection position between the local vehicle 100 and the crossing pedestrian is set. The second intersection time (TCP2) of the crossing pedestrian is calculated as described in (Expression 2), and the second arrival time (TTP2) of the local vehicle 100 is calculated as described in (Expression 4).

Figure 11:
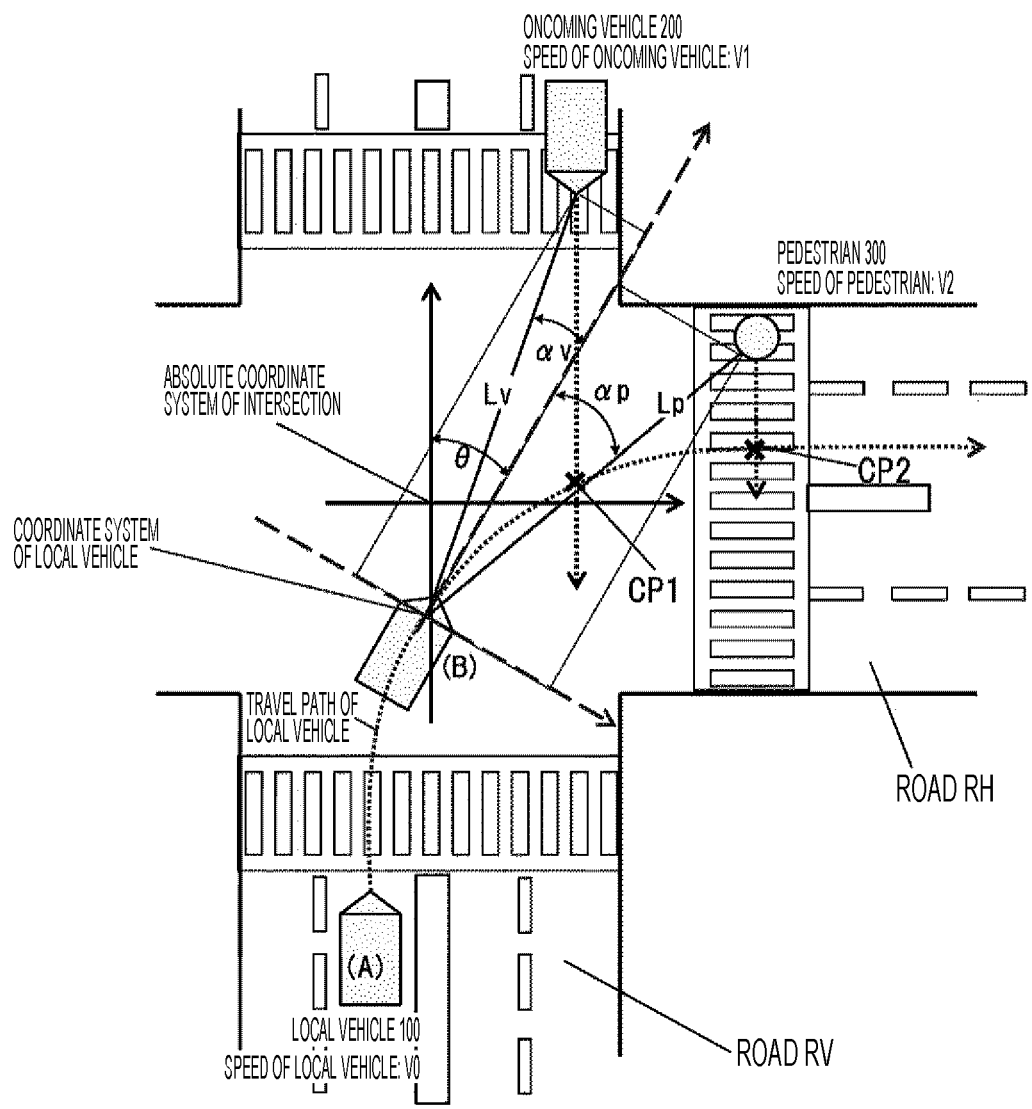
FIG. 11 is an explanatory diagram of an embodiment of a travel scene to which the system for avoiding collision with the plurality of moving bodies according to the invention is applied, illustrating respective parameters and a positional relation between a local vehicle, an oncoming vehicle, and a pedestrian who crosses a road after the local vehicle makes a right turn at the intersection.

Herein, the first intersection position where the travel path of the local vehicle 100 intersects with the oncoming vehicle, the second intersection position where the travel path of the local vehicle 100 intersects with the crossing pedestrian, the speed of the oncoming vehicle and the distance to the first intersection position of the oncoming vehicle, and the speed of the crossing pedestrian and the distance to the second intersection position of the crossing pedestrian will be described using FIG. 11.

As illustrated in FIG. 11, at the time of making a right turn at the intersection, the local vehicle 100 travels on a travel path of the local vehicle depicted by the dotted line while rotating from a position (A) to a position (B) of FIG. 11. The map information around the intersection is acquired from the communication device 50. The parameters such as the road width, the crossing angle of the intersection, and the number of lanes can be used. The travel path of the local vehicle 100 in the intersection is set in advance from the speed (V0) of the local vehicle 100 and the size of the intersection. The travel path may be stored as data together with the map data. In addition, the travel path of the local vehicle 100 may be sequentially calculated from the vehicle parameters such as the speed, the steering angle, and the yaw rate of the local vehicle 100. On the other hand, an oncoming vehicle 200 travels straight on the oncoming vehicle lane toward the local vehicle 100. In addition, a pedestrian 300 crosses the road after the local vehicle 100 makes a right turn at the intersection, and is assumed to move straight in the current advancing direction. In this case, in FIG. 11, a point CP1 becomes the first intersection position where the travel path of the local vehicle 100 intersects with the oncoming vehicle 200, and a point CP2 becomes the second intersection position where the travel path of the local vehicle 100 intersects with the crossing pedestrian 300.

Herein, the local vehicle 100 can estimate the current position of the local vehicle 100 on the actual road using a method such as a local vehicle position estimation using the GPS or a local vehicle position estimation through matching the external environment recognition device and the map/road information.

Next, the oncoming vehicle 200 local vehicle and the crossing pedestrian 300 in front of the local vehicle are detected by the external environment recognition device 80 of the local vehicle 100. At this time, the external environment recognition device 80 mounted in the local vehicle 100 detects a distance (Lv) between the local vehicle 100 and the oncoming vehicle 200 and a detection angle ($\alpha v$), and a distance (Lp) between the local vehicle 100 and the pedestrian 300 and a detection angle ($\alpha p$) on a coordinate system depicted by the broken line in FIG. 11. In addition, when the local vehicle 100 rotates in the intersection, the local vehicle 100 is inclined by the yaw angle ($\theta$) of the local vehicle 100 with respect to the absolute coordinate system of the intersection with the center of the intersection as the origin point. The yaw angle of the vehicle can be calculated by an integration function of a yaw rate sensor mounted in the local vehicle 100. Specifically, the yaw angle ($\theta$) for passing through the intersection, which is a rotation angle in the vehicle coordinate system with respect to the intersection coordinate system, is calculated from the entrance to the intersection until the local vehicle passes through the intersection, and then be cleared to zero after the local vehicle passes through the intersection. Thus, the yaw angle can be obtained from the detection value of the yaw rate sensor. With the distance, the detection angle, the yaw angle for passing through the intersection, and the position coordinates (xv0, yv0) of the local vehicle 100 in the absolute coordinate system of the intersection, the position coordinates (xv1, yv1) of the oncoming vehicle 200 in the absolute coordinate system of the intersection, and the position coordinates (xp1, yp1) of the pedestrian 300 can be obtained as follows.

The position coordinates (xv1, yv1) of the oncoming vehicle 200 are as follows.

$$xv1 = xv0 + Lv \cdot \sin(\theta + \alpha v), \text{ and}$$

$$yv1 = yv0 + Lv \cdot \cos(\theta + \alpha v). \quad \text{[Expression 5]}$$

(herein, xv0 and yv0 indicate the position coordinates of the local vehicle)

The position coordinates (xp1, yp1) of the pedestrian 300 are as follows.

$$xp1 = xv0 + Lp \cdot \sin(\theta + \alpha p), \text{ and}$$

$$yp1 = yv0 + Lp \cdot \cos(\theta + \alpha p). \quad \text{[Expression 6]}$$

(herein, xv0 and yv0 indicate the position coordinates of the local vehicle)

Through (Expression 5) and (Expression 6), the positions of the oncoming vehicle 200 and the pedestrian 100 in the absolute coordinate system of the intersection can be obtained, and the coordinates of the first intersection position and the second intersection position in the absolute coordinate system of the intersection can be obtained. Therefore, the distance between the oncoming vehicle 200 and the first intersection position and the distance between the pedestrian 300 and the second intersection position can be obtained. In addition, when the positions of the oncoming vehicle 200 and the pedestrian 300 are obtained, the speeds of the oncoming vehicle 200 and the pedestrian 300 can also be obtained from an amount of change thereof.

The description is return to the process flow of FIG. 10. When the first intersection time, the first arrival time, the second intersection time, and the second arrival time are calculated in S802, the process proceeds to S803 to determine a collision possibility between the local vehicle 100 and the oncoming vehicle 200. Herein, the collision possibility between the local vehicle 100 and the oncoming vehicle 200 is determined using the first intersection time and the first arrival time. Specifically, for example, in a case where the above Expressions 7 and 8 are established, it is determined that there is no collision possibility.

$$TTP1 < TCP1 - Tcsf \quad \text{[Expression 7]}$$

TCP1: a time (the first intersection time) [s] when the oncoming vehicle 200 arrives at the first intersection position, TTP1: a time (the first arrival time) [s] when the local vehicle 100 arrives at the first intersection position, and Tcsf: a margin time [s].

$$TTP1 > TCP1 + Tcsb \quad \text{[Expression 8]}$$

TCP1: a time (the first intersection time) [s] when the oncoming vehicle 200 arrives at the first intersection position, TTP1: a time (the first arrival time) [s] when the local vehicle 100 arrives at the first intersection position, and Tcsb: a margin time [s].

Herein, as a condition for satisfying Expression 7, there is a case where the local vehicle 100 arrives at the first intersection position earlier by the margin time Tcsf before the oncoming vehicle 200 arrives at the first intersection position. As a condition for satisfying Expression 8, there is a case where the local vehicle 100 arrives at the first intersection position later by the margin time Tcsb after the oncoming vehicle 200 arrives at the first intersection position. The margin time Tcsf is set to a time at which the driver of the oncoming vehicle 200 feels safe when the local vehicle 100 crosses before the oncoming vehicle 200. Specifically, the margin time Tcsf is set to, for example, 1.5 to 2.0 seconds. In addition, the time Tcsb is set to a time at which the driver of the local vehicle 100 feels safe when the local vehicle 100 crosses after the oncoming vehicle 200 passes through the road. Specifically, the margin time Tcsb is set to, for example, 1.0 to 1.5 seconds.

In S803, when it is determined that there is a collision possibility with the oncoming vehicle 200, the process proceeds to S806. The collision avoidance control with respect to the oncoming vehicle 200 is selected. Alternatively, an alarm on a collision possibility with the oncoming vehicle 200 is issued.

In S803, when it is determined that there is no collision possibility with the oncoming vehicle 200, the process proceeds to S804.

In S804, it is determined whether there is a collision possibility between the local vehicle 100 and the crossing pedestrian 300. The collision possibility between the local vehicle 100 and the pedestrian 300 is determined using the second intersection time and the second arrival time. Specifically, for example, in a case where the following Expressions 9 and 10 are satisfied, it is determined that there is no collision possibility.

$$TTP2 < TCP2 - Tpsf \qquad \text{[Expression 9]}$$

TCP2: a time (the second intersection time) [s] when the pedestrian 300 arrives at the second intersection position, TTP2: a time (the second arrival time) [s] when the local vehicle 100 arrives at the second intersection position, and Tpsf: a margin time [s].

$$TTP2 > TCP2 + Tpsb \qquad \text{[Expression 10]}$$

TCP2: a time (the second intersection time) [s] when the pedestrian 300 arrives at the second intersection position, TTP2: a time (the second arrival time) [s] when the local vehicle 100 arrives at the second intersection position, and Tpsb: a margin time [s].

Herein, as a condition for satisfying Expression 9, there is a case where the local vehicle 100 arrives at the second intersection position earlier by the margin time Tpsf before the pedestrian 300 arrives at the second intersection position. As a condition for satisfying Expression 10, there is a case where the local vehicle 100 arrives at the second intersection position later by the margin time Tpbf after the pedestrian 300 arrives at the second intersection position. The margin time Tpsf is set to a time at which the pedestrian 300 feels safe when the local vehicle 100 crosses before the pedestrian 300. Specifically, the margin time Tpsf is set to, for example, 1.5 to 2.0 seconds. In addition, the time Tpsb is set to a time at which the pedestrian 300 and the driver of the local vehicle 100 feel safe when the local vehicle 100 crosses after the pedestrian 300 passes through the road. Specifically, the margin time Tpsb is set to, for example, 1.0 to 1.5 seconds.

In S804, when it is determined that there is no collision possibility with the pedestrian 300, it is determined that there is no collision possibility with both the oncoming vehicle 200 and the pedestrian 300. Therefore, the collision avoidance control is not performed. Alternatively, since there is no collision possibility, the alarm is not issued. On the other hand, when it is determined that there is a collision possibility with the pedestrian, the process proceeds to S805.

In S805, the first intersection time (TCP1) when the oncoming vehicle 200 arrives at the first intersection position is compared to the second intersection time (TCP2) when the pedestrian 300 arrives at the second intersection position. Through the comparison, it is determined whether a difference between the first intersection time (TCP1) and the second intersection time (TCP2) is smaller than a predetermined value. In a case where the difference between the first intersection time (TCP1) and the second intersection time (TCP2) is larger than the predetermined value, the process proceeds to S807 to select the collision avoidance control with respect to the crossing pedestrian 300. In a case where the difference between the first intersection time (TCP1) and the second intersection time (TCP2) is smaller than the predetermined value, the process proceeds to S808 to select control such as the local vehicle 100 is stopped before making a right turn or decelerated before making a right turn, or an alarm on a collision possibility when making a right turn is issued to the driver.

The determination using the difference between the first intersection time (TCP1) and the second intersection time (TCP2) will be described in more detail using FIG. 12.

Figure 12:
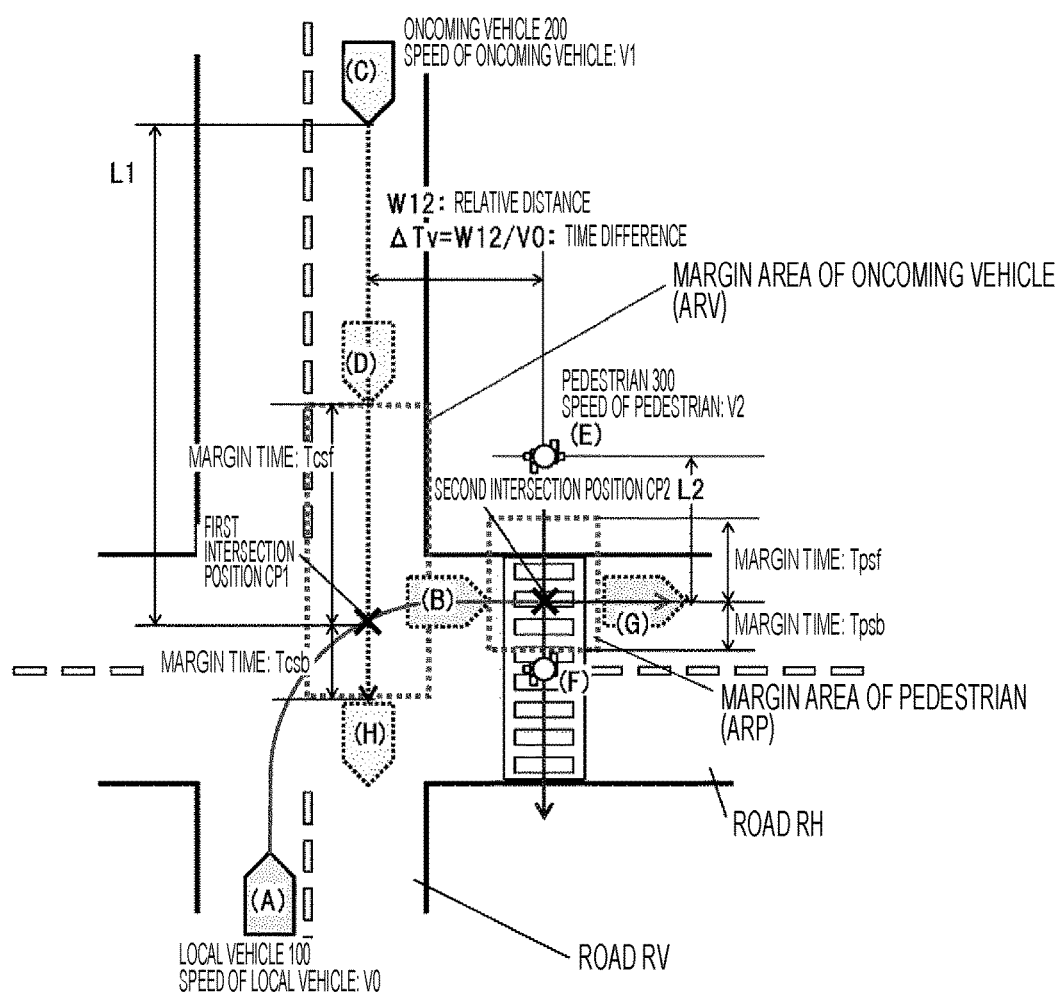
FIG. 12 is an explanatory diagram of an embodiment of the travel scene to which the system for avoiding collision with the plurality of moving bodies according to the invention is applied, relating to control and a determination on that the local vehicle makes a right turn to cross an oncoming vehicle lane in a relation between the local vehicle, the oncoming vehicle, and the pedestrian who crosses the road from an oncoming direction of the local vehicle at the intersection.

FIG. 12 illustrates a positional relation between the local vehicle 100 traveling on the road (RV), the oncoming vehicle 200 traveling on the oncoming vehicle lane of the local vehicle 100 on the road (RV), and the pedestrian 300 crossing the road (RH) intersecting with the road (RV). It is assumed that the local vehicle 100 travels at a speed V0 at a position (A) before entering the intersection, the oncoming vehicle 200 travels at a speed V1 at a position (C) on the oncoming vehicle lane, and the pedestrian 300 walks at a speed V2 at a position (E) before the crosswalk. In addition, the first intersection position where the travel path of the local vehicle 100 intersects with the oncoming vehicle 200 is set to CP1. The second intersection position where the travel path of the local vehicle 100 intersects with the pedestrian 300 is set to CP2. When a distance between the oncoming vehicle 200 at a position (C) and the first intersection position CP1 is set to L1, and a distance between the pedestrian 300 at a position (E) and the second intersection position CP2 is set to L2, the first intersection time TCP1 becomes L1/V1, and the second intersection time TCP2 becomes L2/V2.

In FIG. 12, (D) indicates the position of the oncoming vehicle 200 when the local vehicle 100 crosses before the oncoming vehicle 200. Herein, when the local vehicle 100 crosses immediately before the oncoming vehicle 200, it comes to hinder a course of the oncoming vehicle 200, and gives fear to the driver of the oncoming vehicle 200. Therefore, in a case where the local vehicle 100 passes through the first intersection position, it is desirable that the oncoming vehicle 200 be at a position sufficiently away from the first intersection position. The sufficient position depends on the speed of the oncoming vehicle 200. Therefore, the margin time (Tcsf) is set such that the position is changed according to the speed of the oncoming vehicle 200. In other words, in a case where the first arrival time (TTP1) of the local vehicle 100 is smaller than a time obtained by subtracting the margin time (Tcsf) from the first intersection time (TCP1), the oncoming vehicle 200 is at a position ahead of the first intersection position by the margin time (Tcsf). Therefore, the local vehicle 100 can cross the oncoming vehicle lane without hindering the course of the oncoming vehicle 200 and without giving fear to the driver. In addition, in FIG. 12, (H) indicates the position of the oncoming vehicle 200 when the local vehicle 100 crosses the oncoming vehicle lane after the oncoming vehicle 200 passes through the first intersection position (CP1). Herein, when the local vehicle 100 crosses the oncoming vehicle lane immediately after the oncoming vehicle 200 passes through the first intersection position, it is not desirable due to fear for contact. In a case where the local vehicle 100 passes through the first intersection position, it is desirable that the oncoming vehicle 200 pass through up to a sufficient position from the first intersection position. The sufficient position depends on the speed of the oncoming vehicle 200. Therefore, the margin time (Tcsb) is set such that the position is changed according to the speed of the oncoming vehicle 200. In other words, in a case where the first arrival time (TTP1) of the local vehicle 100 is larger than a time obtained by adding the margin time (Tcsb) to the first intersection time (TCP1), the oncoming vehicle 200 passes through the first intersection position by the margin time (Tcsb). Therefore, the local vehicle 100 can cross the oncoming vehicle lane while keeping a sufficient distance to the oncoming vehicle 200.

Similarly, in FIG. 12, (F) indicates the position of the pedestrian 200 when the local vehicle 100 crosses the crosswalk after the pedestrian 300 passes through the second intersection position (CP2). Herein, when the local vehicle 100 crosses the crosswalk immediately after the pedestrian 300 passes through the second intersection position, it is not desirable due to giving fear to the pedestrian. Therefore, in a case where the local vehicle 100 passes through the second intersection position, it is desirable that the pedestrian 200 pass through up to a sufficient position from the second intersection position. The sufficient position depends on the speed of the pedestrian 300. Therefore, the margin time (Tpsb) is set such that the position is changed according to the speed of the pedestrian 300. In other words, in a case where the second arrival time (TTP2) of the local vehicle 100 is larger than a time obtained by adding the margin time (Tpsb) to the second intersection time (TCP2), the pedestrian 300 passes through the second intersection position by the margin time (Tpsb). Therefore, the local vehicle 100 can cross the crosswalk while keeping a sufficient distance to the pedestrian 300.

From the above description, as a condition for the local vehicle 100 to pass through the intersection while avoiding the collision with the oncoming vehicle 200 and the pedestrian 300 and without giving fear to the oncoming vehicle 200 and the pedestrian 300, the local vehicle passes through the first intersection position (CP1) earlier by a time obtained by subtracting the margin time (Tcsf) from the first intersection time (TCP1), and arrives at the second intersection position (CP2) later by a time obtained by adding the margin time (Tpsb) to the second intersection time (TCP2).

Herein, the following Expression is defined.

$TTP1+\Delta Tv=TTP2$ [Expression 11]

Then, the above condition becomes as follows.

$TCP1-Tcsf>TTP1$, and $TCP2+Tpsb<TTP2.$ [Expression 12]

Therefore, the following Expression is obtained from [Expression 11] and [Expression 12].

$TCP1>TTP1+Tcsf$, and $TCP2<TTP1+\Delta Tv-Tpsb.$ [Expression 13]

To sum up, the following Expression is obtained.

$TCP2-\Delta Tv+Tpsb<TTP1$, and $TTP1<TCP1-Tcsf.$ [Expression 14]

Therefore, the following Expression is obtained.

$TCP1-TCP2>Tpsb+Tcsf-\Delta Tv$ [Expression 15]

Herein, for example, as illustrated in FIG. 12, using a relative distance W12 between the oncoming vehicle 200 and the pedestrian 300 and the speed V0 of the local vehicle 100, $\Delta Tv$ is set to W12/V0 as a time for traveling the relative distance W12.

Further, as another condition other than the above, the local vehicle passes through the first intersection position (CP1) after a time obtained by adding the margin time (Tcsb) to the first intersection time (TCP1), that is, making a right turn after the oncoming vehicle 200 passes through. In this case, it may be considered only the intersection time with the oncoming vehicle 200. Therefore, this case can be covered by the conventional avoidance control in which the collision avoidance with respect to the oncoming vehicle 200 is performed.

Further, in FIG. 12, the area of the margin time Tcsf and the margin time Tcsb regarding the oncoming vehicle 200 is indicated by a margin area of the oncoming vehicle (ARV). The area of the margin time Tpcf and the margin time Tpsb regarding the pedestrian 300 is indicated by a margin area of the pedestrian (ARP). Further, a distance is obtained by multiplying each margin time and the moving speed of the oncoming vehicle 200 or the pedestrian 300.

Next, the description will be made about a relation between the local vehicle 100, the oncoming vehicle 200, and the pedestrian 300 on the condition of the above (Expression 14) using FIG. 13.

Figure 13:
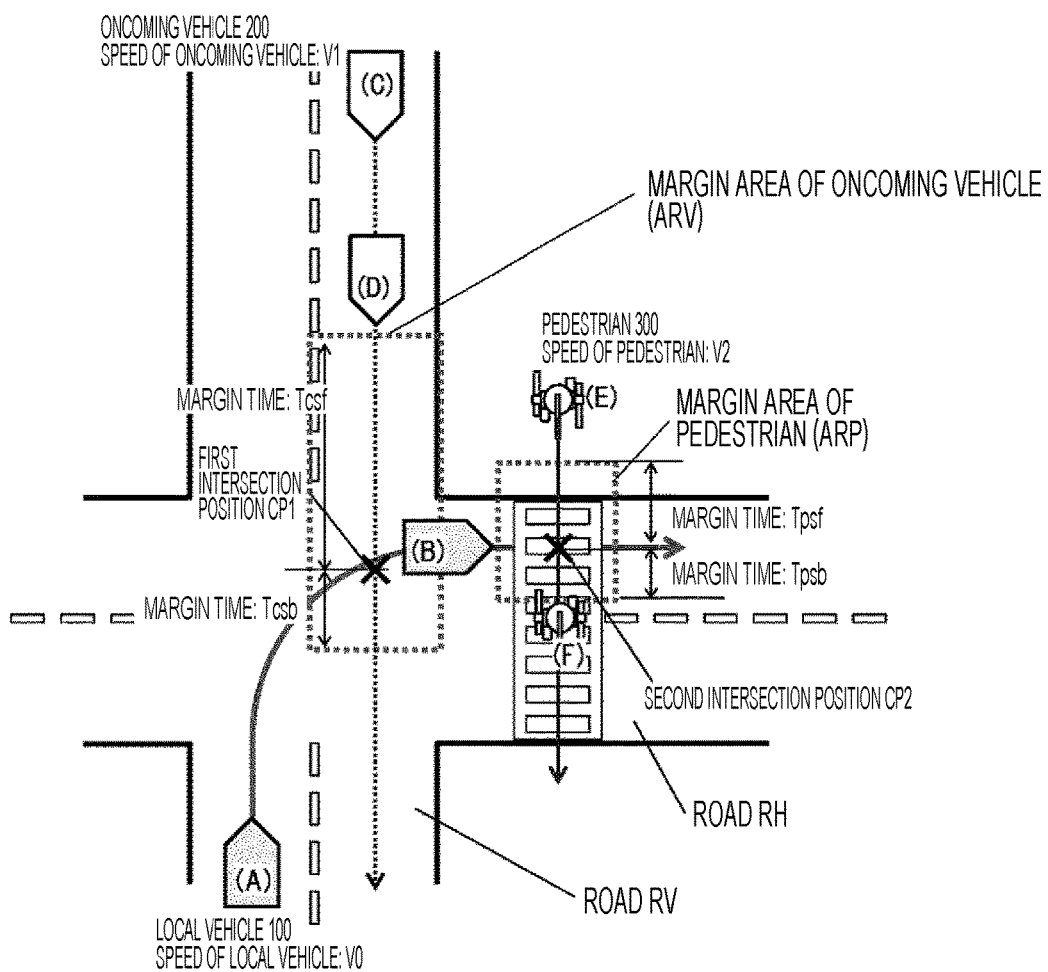
FIG. 13 is an explanatory diagram of an embodiment of the travel scene to which the system for avoiding collision with the plurality of moving bodies according to the invention is applied, relating to control and a determination on that the local vehicle does not cross the oncoming vehicle lane but stops before making a right turn in a relation between the local vehicle, the oncoming vehicle, the pedestrian who crosses the road from the oncoming direction of the local vehicle at the intersection.

In FIG. 13, it is assumed that the local vehicle 100 travels on the road RV, makes a right turn at the intersection, and moves to the road RH. When the local vehicle 100 is at a position (A), the oncoming vehicle 200 is at a position (C) on the oncoming vehicle lane of the road RV, and the pedestrian 300 is at a position (E) crossing the road RH. Herein, when the oncoming vehicle 200 travels at the speed V1 at the position (C), the first intersection time TCP1 can be obtained from a distance to the first intersection position CP1 and the speed using (Expression 1). Similarly, when the pedestrian 300 walks at the speed V2 at the position (E), the second intersection time TCP2 can be obtained from a distance to the second intersection position CP2 and the speed using (Expression 2). In the example of FIG. 13, when the pedestrian 300 passes through the second intersection position CP2 and is at a position (F) as a state where the condition of (Expression 15) is satisfied, the oncoming vehicle 200 is at a position (D) of FIG. 13. Since the condition of (Expression 15) is satisfied, the oncoming vehicle 200 at the position (D) is at a position ahead of the first intersection position CP1 by the margin time Tvsf, and the pedestrian 300 at the position (F) is at a position later by the margin time Tpsb after passing through the second intersection position CP2. In this way, at a stage where the local vehicle 100 is at the position (A) before starting the right turn operation at the intersection, it is determined whether the condition of (Expression 15) is satisfied from the positions and the speeds of the oncoming vehicle 200 and the pedestrian 300. As illustrated in FIG. 13, in a case where the condition of (Expression 15) is satisfied, the local vehicle 100 determines that a right turn is possible and thus performs the right turn operation. Thereafter, when it is determined that there is a possibility of collision with the pedestrian 300 during a right turn, the local vehicle 100 performs the braking control so as to decelerate or stop to avoid the collision with the pedestrian 300. However, since the condition of (Expression 15) is satisfied, when passing through the first intersection position CP1, the local vehicle passes through the first intersection position CP1 earlier by the margin time Tcsf with respect to the oncoming vehicle 200. Therefore, the local vehicle can travel without giving fear and without hindering the course of the oncoming vehicle 200. Furthermore, even when the pedestrian 300 passes through the second intersection position CP2 and arrives at the position of the margin time Tpcb, the oncoming vehicle 200 is at a position ahead of the first intersection position CP1 by the margin time Tcsf. Therefore, in a case where the local vehicle 100 is in a state ready for passing through the second intersection position CP2, the oncoming vehicle 200 is at a position ahead of the first intersection position CP1 by the margin time Tcsf. Accordingly, even in a case where the local vehicle 100 stops until the pedestrian 300 passes through, the oncoming vehicle 200 does not collide with the local vehicle 100.

From the above description, in a state where the condition of (Expression 15) is satisfied, even in a case where the local vehicle 100 stops while waiting for the crossing pedestrian 300 to pass through, the oncoming vehicle 200 and the local vehicle 100 do not collide. Therefore, the local vehicle 100 can make a right turn without causing the collision with any of the oncoming vehicle 200 and the pedestrian 300.

Next, the description will be described about a relation between the local vehicle 100, the oncoming vehicle 200, and the pedestrian 300 on the condition of the above (Expression 15) using FIG. 14.

Figure 14:
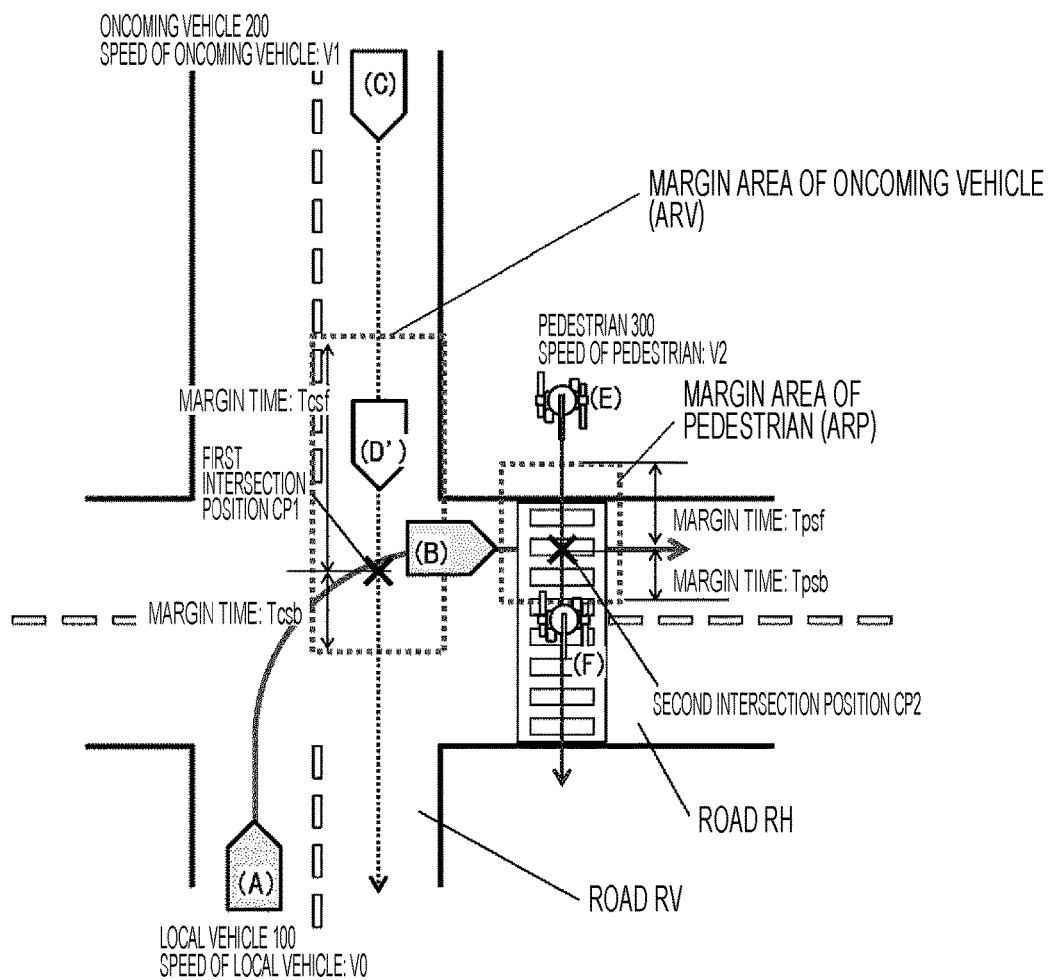
FIG. 14 is an explanatory diagram of another embodiment of the travel scene to which the system for avoiding collision with the plurality of moving bodies according to the invention is applied, relating to control and a determination on that the local vehicle makes a right turn to cross the oncoming vehicle lane in a relation between the local vehicle, the oncoming vehicle, and the pedestrian who crosses the road from the oncoming direction of the local vehicle at the intersection.

In FIG. 14, it is assumed that the local vehicle 100 travels on the road RV, makes a right turn at the intersection, and moves to the road RH. When the local vehicle 100 is at a position (A), the oncoming vehicle 200 is at a position (C) on the oncoming vehicle lane of the road RV, and the pedestrian 300 is at a position (E) crossing the road RH. Herein, when the oncoming vehicle 200 travels at the speed V1 at the position (C), the first intersection time TCP1 can be obtained from a distance to the first intersection position CP1 and the speed using (Expression 1). Similarly, when the pedestrian 300 walks at the speed V2 at the position (E), the second intersection time TCP2 can be obtained from a distance to the second intersection position CP2 and the speed using (Expression 2). In the example of FIG. 14, when the condition of (Expression 15) is not satisfied and the pedestrian 300 passes through the second intersection position CP2 and is at a position (F), the oncoming vehicle 200 is at a position (D') of FIG. 14. Since the condition of (Expression 15) is not satisfied, the oncoming vehicle 200 at the position (D') is at a position near the first intersection position CP1 rather than ahead of the first intersection position CP1 by the margin time Tvsf, and the pedestrian 300 at the position (F) is at a position later by the margin time Tpsb after passing through the second intersection position CP2. In this way, at a stage where the local vehicle 100 is at the position (A) before starting the right turn operation at the intersection, it is determined whether the condition of (Expression 15) is satisfied from the positions and the speeds of the oncoming vehicle 200 and the pedestrian 300. As illustrated in FIG. 14, in a case where the condition of (Expression 15) is not satisfied, the local vehicle 100 determines that a right turn is not possible and thus does not perform the right turn operation. Thereafter, when it is determined that the oncoming vehicle 200 passes through, the local vehicle 100 performs the right turn operation.

In the embodiment of FIG. 14, since the condition of (Expression 15) is not satisfied, even when the local vehicle passes through the first intersection position CP1 earlier by the margin time Tcsf with respect to the oncoming vehicle 200, the local vehicle 100 necessarily decelerates or stops for the pedestrian until the pedestrian 300 passes through the second intersection position CP2 and then arrives at a position of the margin time Tpcb. In this case, since the condition of (Expression 15) is not satisfied, the oncoming vehicle 200 arrives at a position (for example, (D')) near the first intersection position CP1 rather than a position earlier by the margin time Tcsf from the first intersection position CP1 before the pedestrian 300 passes through the second intersection position CP2 and arrives at a position of the margin time Tpsb. Therefore, the local vehicle 100 stops at the position (B) until the pedestrian 300 passes through, so that there is a collision possibility between the local vehicle 100 and the oncoming vehicle 200.

From the above description, since the condition of (Expression 15) is not satisfied, in a case where the local vehicle 100 stops waiting for the crossing pedestrian 300 to pass through, there is a collision possibility between the oncoming vehicle 200 and the local vehicle 100. Therefore, when the local vehicle 100 makes a right turn on the basis of the determination on no collision only about the oncoming vehicle 200, there is a possibility to stop in order to avoid the collision with the pedestrian 300. As a result, there is a collision possibility with the oncoming vehicle 200, and thus making no right turn is determined to avoid the collision with the oncoming vehicle 200 and the pedestrian 300.

Next, the description will be made about another travel scene to which the invention is applied.

Figure 15:
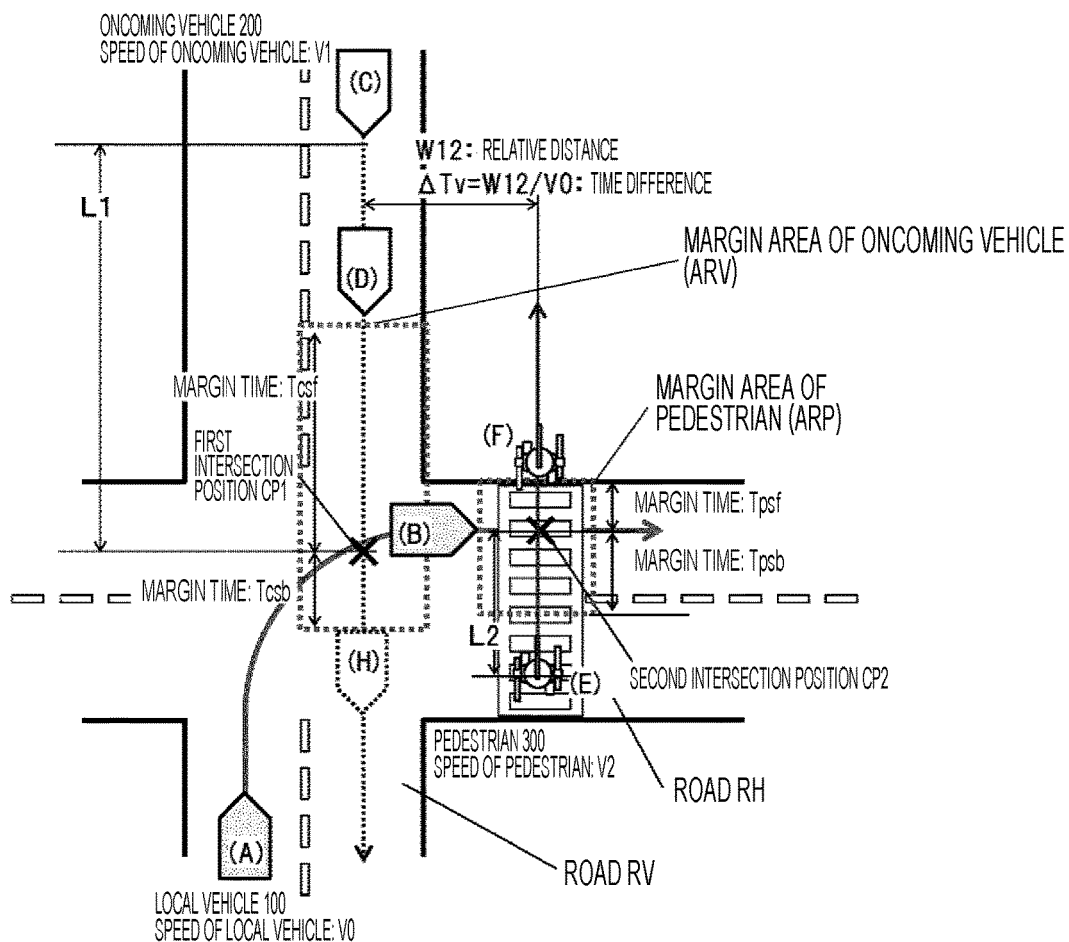
FIG. 15 is an explanatory diagram of another embodiment of the travel scene to which the system for avoiding collision with the plurality of moving bodies according to the invention is applied, relating to control and a determination on that the local vehicle does not cross the oncoming vehicle lane but stops before making a right turn in a relation between the local vehicle, the oncoming vehicle, and the pedestrian who crosses the road from the same direction as that of the subject direction at the intersection.

FIG. 15 illustrates a positional relation between the local vehicle 100 traveling on the road (RV), the oncoming vehicle 200 traveling on the oncoming vehicle lane of the local vehicle 100 on the road (RV), and the pedestrian 300 crossing the road (RH) intersecting with the road (RV). In particular, FIG. 15 is different from FIGS. 12, 13, and 14 in the direction where the crossing pedestrian 300 crosses. In other words, FIG. 15 illustrates an embodiment of the travel scene in which the pedestrian 300 crosses the road RH in the same direction as that of the local vehicle 100 traveling on the road RV. Similarly to FIG. 12, the local vehicle 100 travels at the speed V0 at the position (A) before entering the intersection, and the oncoming vehicle 200 travels at the speed V1 at the position (C) on the oncoming vehicle lane. The pedestrian 300 walks at the speed V2 at the position before the crosswalk or at the position (E) in the middle of crossing the crosswalk. Similarly to FIG. 12, the first intersection position where the travel path of the local vehicle 100 intersects with the oncoming vehicle 200 is set to CP1. The second intersection position where the travel path of the local vehicle 100 intersects with the pedestrian 300 is set to CP2. When a distance between the oncoming vehicle 200 at a position (C) and the first intersection position CP1 is set to L1, and a distance between the pedestrian 300 at a position (E) and the second intersection position CP2 is set to L2, the first intersection time TCP1 becomes L1/V1, and the second intersection time TCP2 becomes L2/V2.

In FIG. 15, (D) indicates the position of the oncoming vehicle 200 when the local vehicle 100 crosses before the oncoming vehicle 200. Herein, when the local vehicle 100 crosses immediately before the oncoming vehicle 200, it comes to hinder a course of the oncoming vehicle 200, and gives fear to the driver of the oncoming vehicle 200. Therefore, in a case where the local vehicle 100 passes through the first intersection position, it is desirable that the oncoming vehicle 200 be at a position sufficiently away from the first intersection position. The sufficient position depends on the speed of the oncoming vehicle 200. Therefore, the margin time (Tcsf) is set such that the position is changed according to the speed of the oncoming vehicle 200. In other words, in a case where the first arrival time (TTP1) of the local vehicle 100 is smaller than a time obtained by subtracting the margin time (Tcsf) from the first intersection time (TCP1), the oncoming vehicle 200 is at a position ahead of the first intersection position by the margin time (Tcsf). Therefore, the local vehicle 100 can cross the oncoming vehicle lane without hindering the course of the oncoming vehicle 200 and without giving fear to the driver. In addition, in FIG. 15, (H) indicates the position of the oncoming vehicle 200 when the local vehicle 100 crosses the oncoming vehicle lane after the oncoming vehicle 200 passes through the first intersection position (CP1). Similarly to FIG. 12, when the local vehicle 100 crosses the oncoming vehicle lane immediately after the oncoming vehicle 200 passes through the first intersection position, it is not desirable due to fear for contact. In a case where the local vehicle 100 passes through the first intersection position, it is desirable that the oncoming vehicle 200 pass through up to a sufficient position from the first intersection position. The sufficient position depends on the speed of the oncoming vehicle 200. Therefore, the margin time (Tcsb) is set such that the position is changed according to the speed of the oncoming vehicle 200. In other words, in a case where the first arrival time (TTP1) of the local vehicle 100 is larger than a time obtained by adding the margin time (Tcsb) to the first intersection time (TCP1), the oncoming vehicle 200 passes through the first intersection position by the margin time (Tcsb). Therefore, the local vehicle 100 can cross the oncoming vehicle lane while keeping a sufficient distance to the oncoming vehicle 200.

Similarly, (F) indicates the position of the pedestrian 200 when the local vehicle 100 crosses the crosswalk after the pedestrian 300 passes through the second intersection position (CP2). Herein, when the local vehicle 100 crosses the crosswalk immediately after the pedestrian 300 passes through the second intersection position, it is not desirable due to giving fear to the pedestrian. Therefore, in a case where the local vehicle 100 passes through the second intersection position, it is desirable that the pedestrian 200 pass through up to a sufficient position from the second intersection position. The sufficient position depends on the speed of the pedestrian 300. Therefore, the margin time (Tpsb) is set such that the position is changed according to the speed of the pedestrian 300. In other words, in a case where the second arrival time (TTP2) of the local vehicle 100 is larger than a time obtained by adding the margin time (Tpsb) to the second intersection time (TCP2), the pedestrian 300 passes through the second intersection position by the margin time (Tpsb). Therefore, the local vehicle 100 can cross the crosswalk while keeping a sufficient distance to the pedestrian 300.

From the above description, as a condition for the local vehicle 100 to pass through the intersection while avoiding the collision with the oncoming vehicle 200 and the pedestrian 300 and without giving fear to the oncoming vehicle 200 and the pedestrian 300, the local vehicle passes through the first intersection position (CP1) earlier by a time obtained by subtracting the margin time (Tcsf) from the first intersection time (TCP1), and arrives at the second intersection position (CP2) later by a time obtained by adding the margin time (Tpsb) to the second intersection time (TCP2).

This condition is expressed by (Expression 15) similarly to FIG. 12.

$$TCP1 - TCP2 > Tpsb + Tcsf - \Delta Tv \quad \text{(Expression 15)}$$

Herein, for example, similarly to FIG. 12, using a relative distance W12 between the oncoming vehicle 200 and the pedestrian 300 and the speed V0 of the local vehicle 100, $\Delta Tv$ is set to W12/V0 as a time for traveling the relative distance W12.

Further, in FIG. 15, the area of the margin time Tcsf and the margin time Tcsb regarding the oncoming vehicle 200 is indicated by a margin area of the oncoming vehicle (ARV). The area of the margin time Tpcf and the margin time Tpsb regarding the pedestrian 300 is indicated by a margin area of the pedestrian (ARP). Further, a distance is obtained by multiplying each margin time and the moving speed of the oncoming vehicle 200 or the pedestrian 300.

Next, the description will be made about a relation between the local vehicle 100, the oncoming vehicle 200, and the pedestrian 300 on the condition of the above (Expression 14). In FIG. 15, it is assumed that the local vehicle 100 travels on the road RV, makes a right turn at the intersection, and moves to the road RH. When the local vehicle 100 is at a position (A), the oncoming vehicle 200 is at a position (C) on the oncoming vehicle lane of the road RV, and the pedestrian 300 is at a position (E) crossing the road RH. Herein, when the oncoming vehicle 200 travels at the speed V1 at the position (C), the first intersection time TCP1 can be obtained from a distance to the first intersection position CP1 and the speed using (Expression 1). Similarly, when the pedestrian 300 walks at the speed V2 at the position (E), the second intersection time TCP2 can be obtained from a distance to the second intersection position CP2 and the speed using (Expression 2). In the example of FIG. 15, when the condition of (Expression 15) is satisfied and the pedestrian 300 passes through the second intersection position CP2 and is at a position (F), the oncoming vehicle 200 is at the position (D) of FIG. 15. Since the condition of (Expression 15) is satisfied, the oncoming vehicle 200 at the position (D) is at a position ahead of the first intersection position CP1 by the margin time Tvsf, and the pedestrian 300 at the position (F) is at a position later by the margin time Tpsb after passing through the second intersection position CP2. In this way, at a stage where the local vehicle 100 is at the position (A) before starting the right turn operation at the intersection, it is determined whether the condition of (Expression 15) is satisfied from the positions and the speeds of the oncoming vehicle 200 and the pedestrian 300. As illustrated in FIG. 15, in a case where the condition of (Expression 15) is satisfied, the local vehicle 100 determines that a right turn is possible and thus makes a right turn. Thereafter, when it is determined that there is a possibility of collision with the pedestrian 300 during a right turn, the local vehicle 100 performs the braking control so as to decelerate or stop to avoid the collision with the pedestrian 300. However, since the condition of (Expression 15) is satisfied, when passing through the first intersection position CP1, the local vehicle passes through the first intersection position CP1 earlier by the margin time Tcsf with respect to the oncoming vehicle 200. Therefore, the local vehicle can travel without giving fear and without hindering the course of the oncoming vehicle 200. Furthermore, even when the pedestrian 300 passes through the second intersection position CP2 and arrives at the position of the margin time Tpcb, the oncoming vehicle 200 is at a position ahead of the first intersection position CP1 by the margin time Tcsf. Therefore, in a case where the local vehicle 100 is in a state ready for passing through the second intersection position CP2, the oncoming vehicle 200 is at a position ahead of the first intersection position CP1 by the margin time Tcsf. Accordingly, even in a case where the local vehicle 100 stops until the pedestrian 300 passes through, the oncoming vehicle 200 does not collide with the local vehicle 100.

From the above description, in a state where the condition of (Expression 15) is satisfied, even in a case where the local vehicle 100 stops while waiting for the crossing pedestrian 300 to pass through, the oncoming vehicle 200 and the local vehicle 100 do not collide. Therefore, the local vehicle 100 can make a right turn without causing the collision with any of the oncoming vehicle 200 and the pedestrian 300.

Figure 16:
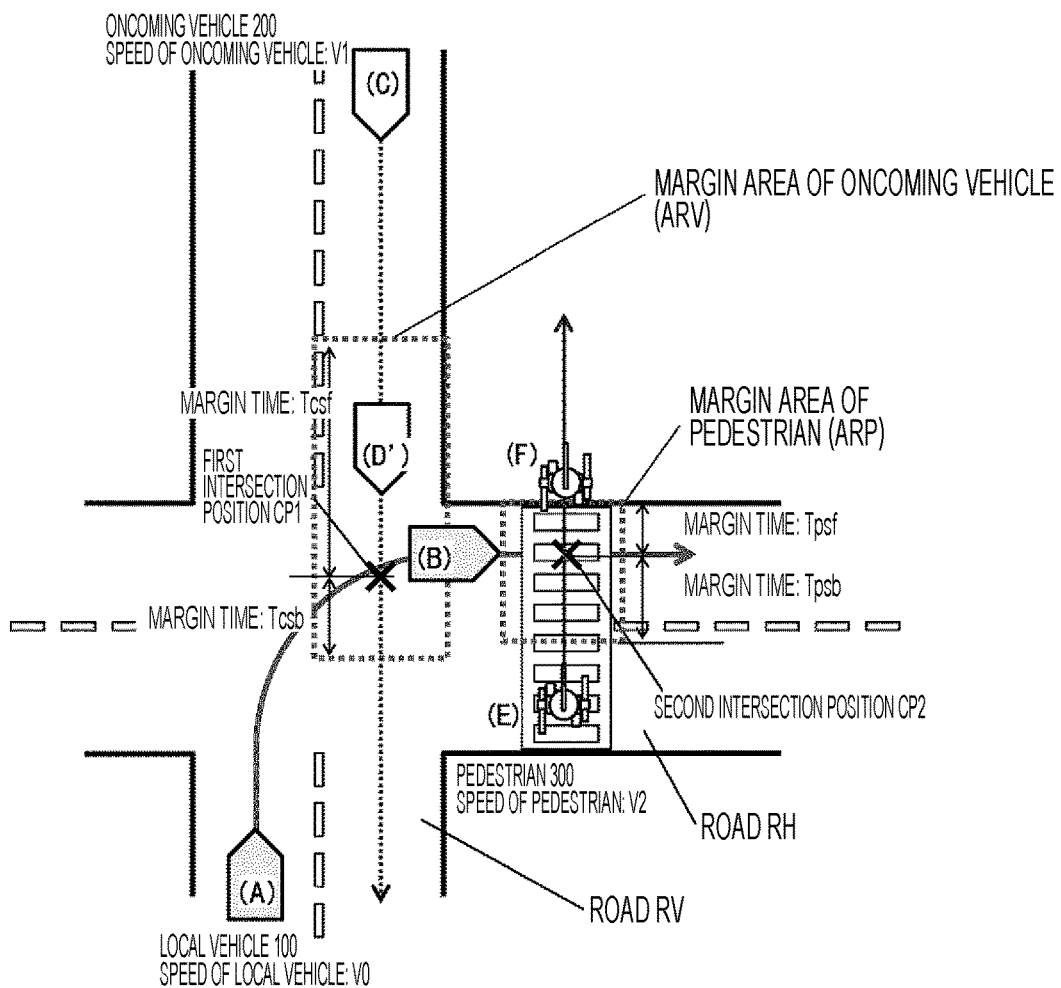
FIG. 16 is an explanatory diagram of another embodiment of the travel scene to which the system for avoiding collision with the plurality of moving bodies according to the invention is applied, relating to control and a determination on that the local vehicle makes a right turn to cross the oncoming vehicle lane in a relation between the local vehicle, the oncoming vehicle, and the pedestrian who cross the road from the same direction as that of the local vehicle at the intersection.

Next, the description will be described about a relation between the local vehicle 100, the oncoming vehicle 200, and the pedestrian 300 on the condition of the above (Expression 15) using FIG. 16. FIG. 16 is different from FIG. 14 in that the pedestrian 300 crosses the road RH in the same direction as that of the local vehicle 100 traveling on the road RV.

In FIG. 16, it is assumed that the local vehicle 100 travels on the road RV, makes a right turn at the intersection, and moves to the road RH. When the local vehicle 100 is at a position (A), the oncoming vehicle 200 is at a position (C) on the oncoming vehicle lane of the road RV, and the pedestrian 300 is at a position (E) crossing the road RH. Herein, when the oncoming vehicle 200 travels at the speed V1 at the position (C), the first intersection time TCP1 can be obtained from a distance to the first intersection position CP1 and the speed using (Expression 1). Similarly, when the pedestrian 300 walks at the speed V2 at the position (E), the second intersection time TCP2 can be obtained from a distance to the second intersection position CP2 and the speed using (Expression 2). In the example of FIG. 16, when the condition of (Expression 15) is not satisfied and the pedestrian 300 passes through the second intersection position CP2 and is at a position (F), the oncoming vehicle 200 is at a position (D') of FIG. 16. Since the condition of (Expression 15) is not satisfied, the oncoming vehicle 200 at the position (D') is at a position near the first intersection position CP1 rather than ahead of the first intersection position CP1 by the margin time Tvsf, and the pedestrian 300 at the position (F) is at a position later by the margin time Tpsb after passing through the second intersection position CP2. In this way, at a stage where the local vehicle 100 is at the position (A) before starting the right turn operation at the intersection, it is determined whether the condition of (Expression 15) is satisfied from the positions and the speeds of the oncoming vehicle 200 and the pedestrian 300. As illustrated in FIG. 16, in a case where the condition of (Expression 15) is not satisfied, the local vehicle 100 determines that a right turn is not possible and thus does not make a right turn. Thereafter, when it is determined that the oncoming vehicle 200 passes through, the local vehicle 100 performs the right turn operation.

In the embodiment of FIG. 16, since the condition of (Expression 15) is not satisfied, even when the local vehicle passes through the first intersection position CP1 earlier by the margin time Tcsf with respect to the oncoming vehicle 200, the local vehicle 100 necessarily decelerates or stops for the pedestrian until the pedestrian 300 passes through the second intersection position CP2 and then arrives at a position of the margin time Tpcb. In this case, since the condition of (Expression 15) is not satisfied, the oncoming vehicle 200 arrives at a position (for example, (D')) near the first intersection position CP1 rather than a position earlier by the margin time Tcsf from the first intersection position CP1 before the pedestrian 300 passes through the second intersection position CP2 and arrives at a position of the margin time Tpsb. Therefore, the local vehicle 100 stops at the position (B) until the pedestrian 300 passes through, so that there is a collision possibility between the local vehicle 100 and the oncoming vehicle 200.

From the above description, since the condition of (Expression 15) is not satisfied, in a case where the local vehicle 100 stops waiting for the crossing pedestrian 300 to pass through, there is a collision possibility between the oncoming vehicle 200 and the local vehicle 100. Therefore, when the local vehicle 100 makes a right turn on the basis of the determination on no collision only about the oncoming vehicle 200, there is a possibility to stop in order to avoid the collision with the pedestrian 300. As a result, there is a collision possibility with the oncoming vehicle 200, and thus making no right turn is determined to avoid the collision with the oncoming vehicle 200 and the pedestrian 300.

Figure 17:
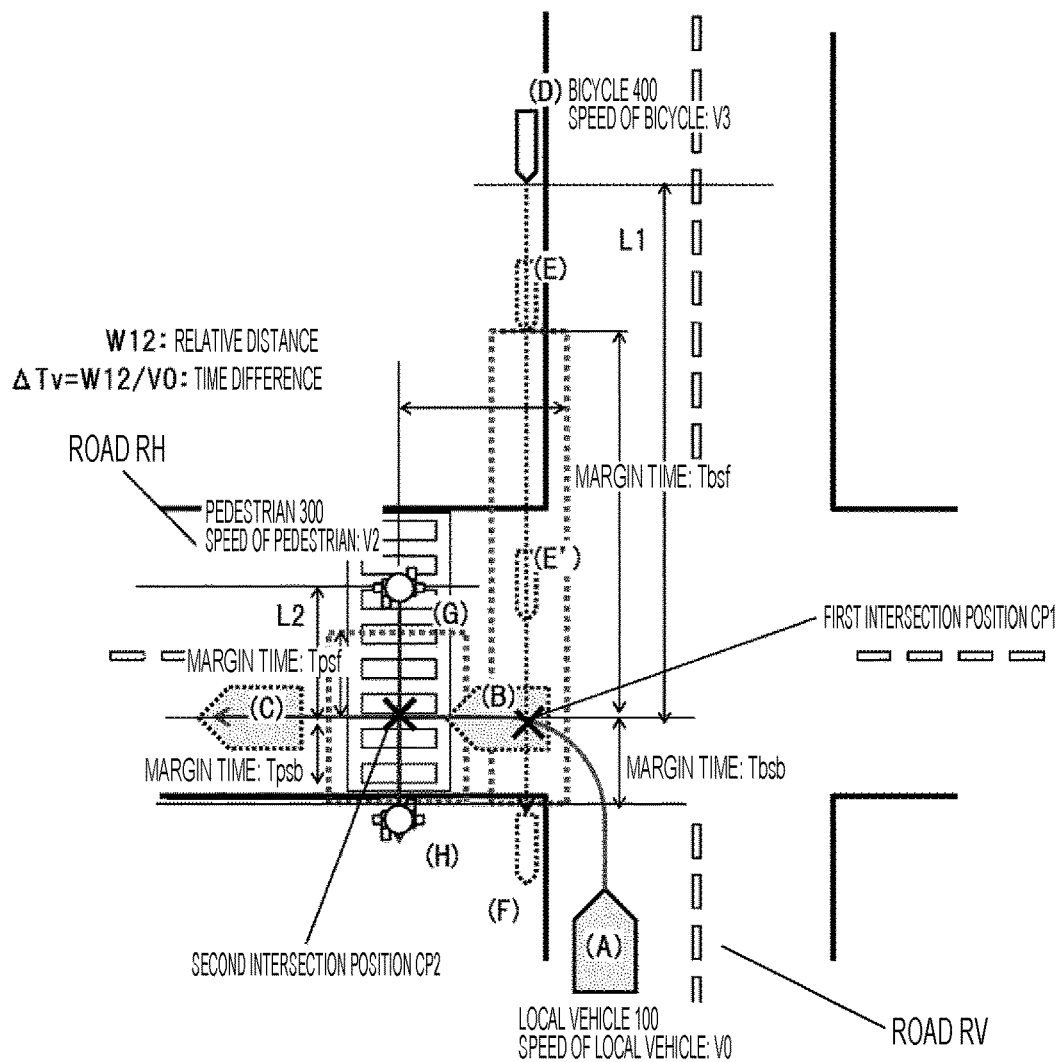
FIG. 17 is an explanatory diagram of another embodiment of the travel scene to which the system for avoiding collision with the plurality of moving bodies according to the invention is applied, relating to control and a determination on whether the local vehicle can make a left turn before making a left turn in a relation between the local vehicle, a light vehicle (bicycle) running in the oncoming direction with respect to the local vehicle, the pedestrian who crosses the road after the local vehicle makes a left turn at the intersection.

FIG. 17 illustrates another embodiment of the invention. FIG. 17 is a diagram for describing an embodiment in a case where the local vehicle 100 makes a left turn at the intersection.

FIG. 17 illustrates a positional relation between the local vehicle 100 traveling on the road (RV), a light vehicle (bicycle) 400 traveling on the oncoming direction of the local vehicle 100 on the road (RV), and the pedestrian 300 crossing the road (RH) intersecting with the road (RV). It is assumed that the local vehicle 100 travels at the speed V0 at a position (A) before entering the intersection, the light vehicle (bicycle) 400 travels at a speed V3 at a position (D), and the pedestrian 300 walks at the speed V2 at a position (G) before the crosswalk. In addition, the first intersection position where the travel path of the local vehicle 100 intersects with the light vehicle (bicycle) 400 is set to CP1. The second intersection position where the travel path of the local vehicle 100 intersects with the pedestrian 300 is set to CP2. When a distance between the light vehicle (bicycle) 400 at the position (D) and the first intersection position CP1 is set to L1, and a distance between the pedestrian 300 at the position (G) and the second intersection position CP2 is set to L2, the first intersection time TCP1 becomes L1/V1, and the second intersection time TCP2 becomes L2/V2.

In FIG. 17, (E) indicates the position of the light vehicle (bicycle) 400 when the local vehicle 100 crosses before the light vehicle (bicycle) 400. Herein, when the local vehicle 100 crosses immediately before the light vehicle (bicycle) 400, it comes to hinder a course of the light vehicle (bicycle) 400, and gives fear to the light vehicle (bicycle) 400. Therefore, in a case where the local vehicle 100 passes through the first intersection position, it is desirable that the light vehicle (bicycle) 400 be at a position sufficiently away from the first intersection position. The sufficient position depends on the speed of the light vehicle (bicycle) 400. Therefore, the margin time (Tbsf) is set such that the position is changed according to the speed of the light vehicle (bicycle) 400. In other words, in a case where the first arrival time (TTP1) of the local vehicle 100 is smaller than a time obtained by subtracting the margin time (Tbsf) from the first intersection time (TCP1), the light vehicle (bicycle) 400 is at a position ahead of the first intersection position by the margin time (Tbsf). Therefore, the local vehicle 100 can cross the oncoming vehicle lane without hindering the course of the light vehicle (bicycle) 400 and without giving fear to the driver. In addition, in FIG. 17, (F)

indicates the position of the light vehicle (bicycle) 400 when the local vehicle 100 passes through the first intersection position CP1 after the light vehicle (bicycle) 400 passes through the first intersection position (CP1). Herein, when the local vehicle 100 crosses the oncoming vehicle lane immediately after the light vehicle (bicycle) 400 passes through the first intersection position, it is not desirable due to fear for contact. In a case where the local vehicle 100 passes through the first intersection position, it is desirable that the light vehicle (bicycle) 400 pass through up to a sufficient position from the first intersection position. The sufficient position depends on the speed of the light vehicle (bicycle) 400. Therefore, the margin time (Tbsb) is set such that the position is changed according to the speed of the light vehicle (bicycle) 400. In other words, in a case where the first arrival time (TTP1) of the local vehicle 100 is larger than a time obtained by adding the margin time (Tcsb) to the first intersection time (TCP1), the light vehicle (bicycle) 400 passes through the first intersection position by the margin time (Tbsb). Therefore, the local vehicle 100 passes through the first intersection position CP1 while keeping a sufficient distance to the light vehicle (bicycle) 400.

Similarly, in FIG. 17, (H) indicates the position of the pedestrian 200 when the local vehicle 100 crosses the crosswalk after the pedestrian 300 passes through the second intersection position (CP2). Herein, when the local vehicle 100 crosses the crosswalk immediately after the pedestrian 300 passes through the second intersection position, it is not desirable due to giving fear to the pedestrian. Therefore, in a case where the local vehicle 100 passes through the second intersection position, it is desirable that the pedestrian 200 pass through up to a sufficient position from the second intersection position. The sufficient position depends on the speed of the pedestrian 300. Therefore, the margin time (Tpsb) is set such that the position is changed according to the speed of the pedestrian 300. In other words, in a case where the second arrival time (TTP2) of the local vehicle 100 is larger than a time obtained by adding the margin time (Tpsb) to the second intersection time (TCP2), the pedestrian 300 passes through the second intersection position by the margin time (Tpsb). Therefore, the local vehicle 100 can cross the crosswalk while keeping a sufficient distance to the pedestrian 300.

From the above description, as a condition for the local vehicle 100 to pass through the intersection while avoiding the collision with the light vehicle (bicycle) 400 and the pedestrian 300 and without giving fear to the light vehicle (bicycle) 400 and the pedestrian 300, the local vehicle passes through the first intersection position (CP1) earlier by a time obtained by subtracting the margin time (Tbsf) from the first intersection time (TCP1), and arrives at the second intersection position (CP2) later by a time obtained by adding the margin time (Tpsb) to the second intersection time (TCP2).

Herein, the following Expression is defined.

$$TTP1 + \Delta Tv2 = TTP2 \quad \text{[Expression 16]}$$

Then, the above condition becomes as follows.

$$TCP1 - Tbsf > TTP1, \text{ and}$$

$$TCP2 + Tpsb < TTP2. \quad \text{[Expression 17]}$$

Therefore, the following Expression is obtained from [Expression 16] and [Expression 17].

$$TCP1 > TTP1 + Tbsf, \text{ and}$$

$$TCP2 < TTP1 + \Delta Tv2 - Tpsb \quad \text{[Expression 18]}$$

To sum up, the following Expression is obtained.

$$TCP2 - \Delta Tv2 + Tpsb < TTP1, \text{ and}$$

$$TTP1 < TCP1 - Tbsf. \quad \text{[Expression 19]}$$

Therefore, the following Expression is obtained.

$$TCP1 - TCP2 > Tpsb + Tbsf - \Delta Tv2 \quad \text{[Expression 20]}$$

Herein, for example, as illustrated in FIG. 17, using the relative distance W12 between the light vehicle (bicycle) 400 and the pedestrian 300 and the speed V0 of the local vehicle 100, $\Delta Tv2$ is set to W12/V0 as a time for traveling the relative distance W12.

Further, as another condition other than the above, the local vehicle passes through the first intersection position (CP1) after a time obtained by adding the margin time (Tbsb) to the first intersection time (TCP1), that is, making a left turn after the light vehicle (bicycle) 400 passes through. In this case, it may be considered only the intersection time with the light vehicle (bicycle) 400. Therefore, this can be covered by the conventional avoidance control in which the collision avoidance to the light vehicle (bicycle) 400 is performed.

Further, in FIG. 17, the area of the margin time Tbsf and the margin time Tbsb regarding the light vehicle (bicycle) 400 is indicated by a margin area (ARB) of the light vehicle (bicycle) (ARG). The area of the margin time Tpcf and the margin time Tpsb regarding the pedestrian 300 is indicated by a margin area of the pedestrian (ARP). Further, a distance is obtained by multiplying each margin time and the moving speed of the light vehicle (bicycle) 400 or the pedestrian 300.

FIG. 17 illustrates a travel scene in which the light vehicle (bicycle) 400 travels in place of the oncoming vehicle 200 of FIG. 12 and the local vehicle 100 makes a left turn, which can be considered similarly to the descriptions of FIGS. 12, 13, and 14.

In FIG. 17, when the pedestrian 300 passes through the second intersection position CP2 and is at a position (H) as a case where the condition of (Expression 20) is satisfied, the light vehicle (bicycle) 400 is at the position (E) of FIG. 13. Since the condition of (Expression 20) is satisfied, the light vehicle (bicycle) 400 at the position (E) is at a position ahead of the first intersection position CP1 by the margin time Tbsf, and the pedestrian 300 at the position (H) is at a position later by the margin time Tpsb after passing through the second intersection position CP2. In this way, at a stage where the local vehicle 100 is at the position (A) before starting a left turn operation at the intersection, it is determined whether the condition of (Expression 20) is satisfied from the positions and the speeds of the light vehicle (bicycle) 400 and the pedestrian 300. In a case where the condition of (Expression 20) is satisfied, the local vehicle 100 determines that a left turn is possible and thus performs the left turn operation. Thereafter, when it is determined that there is a possibility of collision with the pedestrian 300 during a left turn, the local vehicle 100 performs the braking control so as to decelerate or stop to avoid the collision with the pedestrian 300. However, since the condition of (Expression 20) is satisfied, when passing through the first intersection position CP1, the local vehicle passes through the first intersection position CP1 earlier by the margin time Tbsf with respect to the light vehicle (bicycle) 400. Therefore, the local vehicle can travel without giving fear and without hindering the course of the light vehicle (bicycle) 400. Furthermore, even when the pedestrian 300 passes through the second intersection position CP2 and arrives at the position of the margin time Tpcb, the light vehicle (bicycle) 400 is at a position ahead of the first intersection position CP1 by the margin time Tbsf. Therefore, in a case where the local vehicle 100 is in a state ready for passing through the second intersection position CP2, the light vehicle (bicycle) 400 is at a position ahead of the first intersection position CP1 by the margin time Tbsf. Accordingly, even in a case where the local vehicle 100 stops until the pedestrian 300 passes through, the light vehicle (bicycle) 400 does not collide with the local vehicle 100. From the above description, in a state where the condition of (Expression 20) is satisfied, even in a case where the local vehicle 100 stops while waiting for the pedestrian 300 to pass through, the light vehicle (bicycle) 400 and the local vehicle 100 do not collide. Therefore, the local vehicle 100 can make a left turn without causing the collision with any of the light vehicle (bicycle) 400 and the pedestrian 300.

Similarly, the description will be made using FIG. 17 about a state where the condition of (Expression 20) is not satisfied. When the pedestrian 300 passes through the second intersection position CP2 and is at the position (H), the light vehicle (bicycle) 400 is at a position (E') of FIG. 17. Since the condition of (Expression 20) is not satisfied, the light vehicle (bicycle) 400 at the position (E') is at a position near the first intersection position CP1 rather than ahead of the first intersection position CP1 by the margin time Tbsf, and the pedestrian 300 at the position (H) is at a position later by the margin time Tpsb after passing through the second intersection position CP2. In this way, at a stage where the local vehicle 100 is at the position (A) before starting a left turn operation at the intersection, it is determined whether the condition of (Expression 20) is satisfied from the positions and the speeds of the light vehicle (bicycle) 400 and the pedestrian 300. In a case where the condition of (Expression 20) is not satisfied, the local vehicle 100 determines that a left turn is not possible and thus does not make a left turn. Thereafter, when it is determined that the light vehicle (bicycle) 400 passes through, the local vehicle 100 performs the left turn operation. More specifically, in a case where the condition of (Expression 20) is not satisfied, even when the local vehicle passes through the first intersection position CP1 earlier by the margin time Tbsf with respect to the light vehicle (bicycle) 400, the local vehicle 100 necessarily decelerates or stops for the pedestrian until the pedestrian 300 passes through the second intersection position CP2 and then arrives at a position of the margin time Tpcb. In this case, since the condition of (Expression 20) is not satisfied, the light vehicle (bicycle) 400 arrives at a position (for example, (E')) near the first intersection position CP1 rather than a position earlier by the margin time Tbsf from the first intersection position CP1 before the pedestrian 300 passes through the second intersection position CP2 and arrives at a position of the margin time Tpsb. Therefore, the local vehicle 100 stops at the position (B) until the pedestrian 300 passes through, so that there is a collision possibility between the local vehicle 100 and the light vehicle (bicycle) 400. From the above description, since the condition of (Expression 20) is not satisfied, in a case where the local vehicle 100 stops waiting for the pedestrian 300 to pass through, there is a collision possibility between the light vehicle (bicycle) 400 and the local vehicle 100. Therefore, when the local vehicle 100 makes a left turn on the basis of the determination on no collision only about the light vehicle (bicycle) 400, there is a possibility to stop in order to avoid the collision with the pedestrian 300. As a result, there is a collision possibility with the light vehicle (bicycle) 400, and thus making no left turn is determined to avoid the collision with the light vehicle (bicycle) 400 and the pedestrian 300.

Still another embodiment of the invention will be described using FIG. 18.

Figure 18:
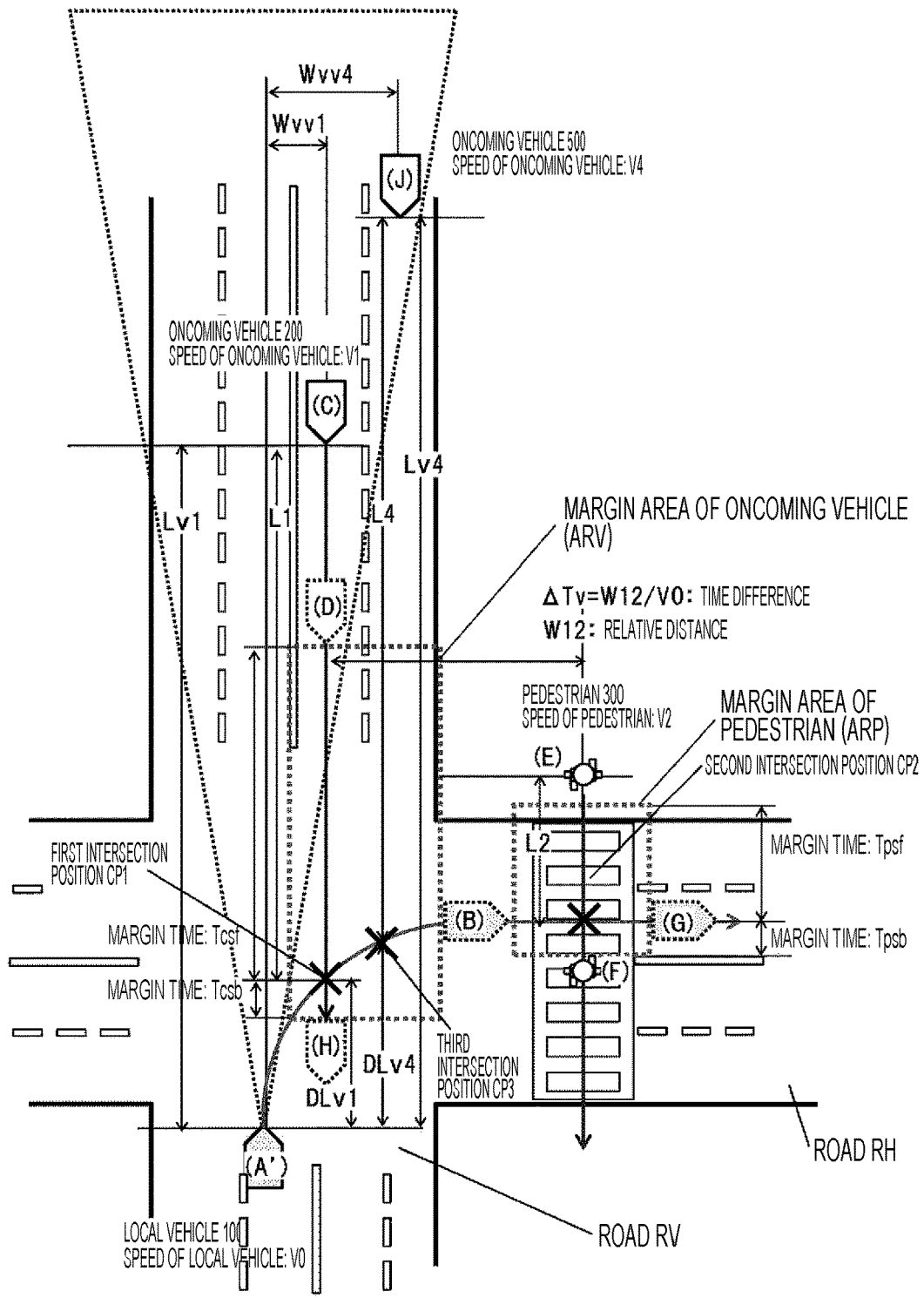
FIG. 18 is an explanatory diagram of another embodiment of the travel scene to which the system for avoiding collision with the plurality of moving bodies according to the invention is applied, relating to control and a determination on whether the local vehicle can make a right turn before making a right turn in a relation between the local vehicle, the oncoming vehicles in a plurality of oncoming vehicle lanes, and the pedestrian who crosses the road after the local vehicle makes a right turn at the intersection.

FIG. 18 illustrates a travel scene in which a four-lane road is assumed together with the roads RV and RH. In addition, the local vehicle 100 travels on the road RV, and the oncoming vehicle 200 and an oncoming vehicle 500 travel on the oncoming vehicle lane of the road RV. In addition, on the road RH after the local vehicle 100 makes a right turn at the intersection, the pedestrian 300 crosses the road RH. Further, in FIG. 18, the pedestrian 300 moves in the oncoming direction to that of the local vehicle 100 traveling on the road RV, but it does not matter even in the case of the same direction. The speed of the local vehicle 100 is V0, and the speeds of the oncoming vehicle 200 and the oncoming vehicle 500 are respectively V1 and V4. In addition, the speed of the pedestrian 300 is V2. As illustrated in FIG. 18, in a case where the local vehicle 100 is at a position (A'), the oncoming vehicle 200 is at the position (D), and the oncoming vehicle 500 is at a position (J), when the front side is detected using the external environment recognition device 80 mounted in the local vehicle 100, the oncoming vehicle 200 at the position (D) and the oncoming vehicle 500 at the position (J) come to be in the same direction on a straight line when viewed from the local vehicle 100. The oncoming vehicle 500 at the position (J) comes to be concealed by the oncoming vehicle at the position (D) when viewed from the local vehicle 100 at the position (A'). Therefore, the oncoming vehicle 500 may be not detected by the external environment recognition device 80 of the local vehicle 100. In this way, when the oncoming vehicle 500 and the oncoming vehicle 200 are kept on traveling on the same straight line when viewed from the local vehicle 100, the external environment recognition device 80 of the local vehicle 100 cannot continuously detect the oncoming vehicle 500. Therefore, it is not possible to recognize the presence of the oncoming vehicle 500. Herein, the description will be made about a relation between the oncoming vehicle 200 and the oncoming vehicle 500 which cannot be detected by the external environment recognition device 80 of the local vehicle 100.

As illustrated in FIG. 18, a distance in the lateral direction between the local vehicle 100 and the oncoming vehicle 200 is set to Wvv1, a distance in the lateral direction between the local vehicle 100 and the oncoming vehicle 500 is set to Wvv4, a distance in the longitudinal direction between the local vehicle 100 and the oncoming vehicle 200 is set to Lv1, and a distance in the longitudinal direction between the local vehicle 100 and the oncoming vehicle 500 is set to Lv4. In a case where the oncoming vehicle 200 and the oncoming vehicle 500 are on the same straight line when viewed from the local vehicle 100, the following relation is established.

$$Lv1:Lv4=Wvv1:Wvv4=V0+V1:V0+V4 \quad \text{[Expression 21]}$$

Herein, an intersecting point between the travel path of the local vehicle 100 and the oncoming vehicle 500 is set to a third intersection position CP3, and a distance between the oncoming vehicle 500 and the third intersection position CP3 is set to L4. In a case where the oncoming vehicle 500 and the oncoming vehicle 200 are on the same straight line, [Expression 21] is established. Therefore, in a case where the external environment recognition device 80 of the local vehicle 100 cannot detect the oncoming vehicle 500 even when there is the oncoming vehicle 500, the speed and the distance Lv4 of the oncoming vehicle 500 become as follows.

$$V4=(Wvv4+Wvv1)\times V1+(Wvv4-Wvv1)+Wvv1\times V0 \quad \text{[Expression 22]}$$

$$Lv4=(Wvv4+Wvv1)\times Lv1 \qquad \text{[Expression 23]}$$

Herein, the distances from the local vehicle 100 to the first intersection position CP1 and the third intersection position CP3 are set to DLv1 and DLv4.

$$L4=Lv4-DLv4=(Wvv4+Wvv1)\times(L1-DLv1)-DLv4 \qquad \text{[Expression 24]}$$

Herein, the distances DLv1 and DLv4 from the local vehicle 100 to the first intersection position CP1 and the third intersection position CP3, the distance Wvv1 in the lateral direction between the local vehicle 100 and the oncoming vehicle 200, and the distance Wvv4 in the lateral direction between the local vehicle 100 and the oncoming vehicle 500 can be obtained from the road map information, the intersection map information, and the current position of the local vehicle 100. Therefore, it is possible to virtually obtain the speed V4 and the distance L4 to the third intersection position CP3 with respect to the oncoming vehicle 500 which is assumed to be concealed by the oncoming vehicle 200 and thus not detected. Therefore, even when the oncoming vehicle 500 cannot be detected, it is possible to predict a time (third intersection time TCP3) when the oncoming vehicle 500 virtually arrives at the third intersection position CP3.

$$TCP3=L4+V4 \qquad \text{[Expression 25]}$$

From the above description, the third intersection position CP3 is set for the virtual oncoming vehicle 500, and thus the third intersection time TCP3 taken for arriving at the third intersection position can be obtained. Then, using the first intersection time TCP1, the second intersection time TCP2, and the third intersection time TCP3, in a case where the local vehicle 100 makes a right turn, it is possible to determine whether there is a possibility to conflict with the oncoming vehicle 200, the virtual oncoming vehicle 500, and the pedestrian 300. In a case where there is a possibility suggesting the presence of the virtual oncoming vehicle 500, it is possible to warn the driver about the possibility suggesting the presence of the virtual oncoming vehicle 500 in advance using the alarm means 69.

Next, the description will be made about a case where three moving bodies (the oncoming vehicle 200, the oncoming vehicle 500, and the pedestrian 300) and the travel path of the local vehicle 100 intersect with each other when there is the virtual oncoming vehicle 500, or there is the oncoming vehicle 500 in reality.

As a magnitude relation between three intersection times (TCP1, TCP3, and TCP2), there are six cases as illustrated in FIG. 19. The intersection time is a time to arrive at each intersection position (CP1, CP2, and CP3). Therefore, Case 1 indicates that the pedestrian 300 is the first to arrive at the second intersection position CP2, the oncoming vehicle 500 is the next to arrive at the third intersection position CP3, and the oncoming vehicle 200 is the last to arrive at the first intersection position CP1) as timings for the respective moving bodies (the oncoming vehicle 200, the pedestrian 300, and the oncoming vehicle 500) to arrive at the respective intersection positions (CP1, CP2, and CP3).

In Case 1, the respective moving bodies (the oncoming vehicle 200, the oncoming vehicle 500, and the pedestrian 300) arrive at the respective intersection positions (the first intersection position CP1, the third intersection position CP3, and the second intersection position CP2) in an order of the intersection position farthest away from the local vehicle 100. Therefore, in a case where it is determined that there is no collision possibility with the oncoming vehicle 200 and the following condition is established, it is determined that the local vehicle can make a right turn.

$$TCP1-TCP3 \geq T13 \qquad \text{[Expression 26]}$$

(where, T13: margin time)

$$TCP3-TCP2 \geq T32 \qquad \text{[Expression 27]}$$

(where, T32: margin time)

In this case, when there is no collision possibility with the oncoming vehicle 200 and the condition of (Expression 26) is established, the oncoming vehicle 200 is at a position of the margin time even when the local vehicle 100 stops at a position ahead of the third intersection position CP3, and waits for the oncoming vehicle 500 to pass through the third intersection position CP3. Therefore, the collision possibility with the oncoming vehicle 200 is low. In addition, when the condition of (Expression 27) is established, the oncoming vehicle 500 is at a position of the margin time even when the local vehicle 100 stops at a position ahead of the second intersection position CP2, and waits for the pedestrian 300 to pass through the second intersection position CP2. Therefore, the collision possibility with the oncoming vehicle 500 is low.

Case 2 indicates that the oncoming vehicle 500 is the first to arrive at the third intersection position CP3. Therefore, in a case where it is determined that the collision possibility with the oncoming vehicle 200 is low and the following condition is established, it is determined that the local vehicle can make a right turn.

$$TCP1-TCP3 \geq T13 \qquad \text{[Expression 28]}$$

(where, T13: margin time)

$$TCP1-TCP2 \geq T12 \qquad \text{[Expression 29]}$$

(where, T12: margin time)

In this case, since there is no collision possibility with the oncoming vehicle 200 and the condition of (Expression 28) is established, the oncoming vehicle 200 is at a position of the margin time even when the local vehicle 100 stops at a position ahead of the third intersection position CP3, and waits for the oncoming vehicle 500 to pass through the third intersection position CP3. Therefore, the collision possibility with the oncoming vehicle 200 is low. Furthermore, since the condition of (Expression 29) is established, the collision possibility with the oncoming vehicle 200 is low even when the local vehicle 100 stops at a position ahead of the second intersection position CP2 and waits for the pedestrian 300 to pass through the second intersection position CP2.

Case 3 indicates that the pedestrian 300 is the first to arrive at the second intersection position CP2 and the oncoming vehicle 500 is the last to arrive at the third intersection position CP3. Therefore, in a case where it is determined that there is no collision possibility with the oncoming vehicle 200 and the following condition is established, it is determined that the local vehicle can make a right turn.

$$TCP1-TCP2 \geq T12 \qquad \text{[Expression 30]}$$

(where, T12: margin time)

In this case, since the oncoming vehicle 500 arrives late at the third intersection position CP3 compared to the oncoming vehicle 200, the collision possibility between the oncoming vehicle 500 and the local vehicle 100 is low.

Case 4 indicates that the oncoming vehicle 500 is the first to arrive at the third intersection position CP3 and the pedestrian 300 is the last to arrive at the second intersection position CP2. Therefore, in a case where it is determined that there is no collision possibility with the oncoming vehicle 200 and the following condition is established, it is determined that the local vehicle can make a right turn.

$$TCP1-TCP3 \geq T13 \quad \text{[Expression 31]}$$

(where, T13: margin time)

$$TCP2-TCP3 \geq T23 \quad \text{[Expression 32]}$$

(where, T23: margin time)

In this case, even when the local vehicle 100 stops at a position ahead of the third intersection position CP3 in order to wait for the oncoming vehicle 500 to pass through, and the local vehicle 100 passes through the third intersection position after the oncoming vehicle 500 passes through on the basis of the condition of (Expression 31), the collision possibility with the oncoming vehicle 200 is low. In addition, even when the local vehicle arrives at the second intersection position CP2 after the oncoming vehicle 500 passes through on the basis of the condition of (Expression 32), the collision possibility with the pedestrian 300 is low. However, since there is a high possibility to hinder the course of the pedestrian 300 when the local vehicle passes through in front of the pedestrian 300, it is desirable that the margin time T23 be set to be sufficiently large.

Case 5 indicates that the respective moving bodies (the oncoming vehicle 200, the oncoming vehicle 500, and the pedestrian 300) arrive at the respective intersection positions (the first intersection position CP1, the third intersection position CP3, and the second intersection position CP2) in an order of the intersection position closest to the local vehicle 100. Therefore, when it is determined that there is no collision possibility with any one of the oncoming vehicle 200, the oncoming vehicle 500, and the pedestrian 300, it is determined that the local vehicle can make a right turn.

Case 6 indicates that the oncoming vehicle 200 is the first to arrive at the first intersection position CP1 and the pedestrian 300 is the next to arrive at the second intersection position CP2. Therefore, in a case where it is determined that there is no collision possibility with the oncoming vehicle 200 and the following condition is established, it is determined that the local vehicle can make a right turn.

$$TCP3-TCP2 \geq T32 \quad \text{[Expression 33]}$$

(where, T32: margin time)

$$TCP1<0 \quad \text{[Expression 34]}$$

(after the oncoming vehicle 200 passes through the first intersection position CP1)

In this case, when the local vehicle 100 passes through the first intersection position CP1 after the oncoming vehicle 200 passes through the first intersection position CP1, and even when the local vehicle 100 stops at a position ahead of the second intersection position CP2 in order to wait for the pedestrian 300 to pass through the second intersection position CP2 on the basis of the condition of (Expression 33), the collision possibility with the oncoming vehicle 500 is low. However, in a case where the local vehicle 100 passes through the first intersection position CP1 before the oncoming vehicle 200 passes through the first intersection position CP1, and when the local vehicle 100 stops at a position ahead of the second intersection position CP2 in order to wait for the pedestrian 300 to pass through the second intersection position CP2, the collision possibility with the oncoming vehicle 200 is increased. Therefore, it is desirable not to make a right turn.

Hitherto, the description has been made about the avoidance control performed in the invention in which the collision possibility with the moving body around the local vehicle 100 is determined, and in a case where there is a collision possibility, an alarm is informed to the driver or the brake device is automatically controlled to decelerate the local vehicle 100. Herein, in the vehicle control device 60 of the local vehicle 100, the collision avoidance control means 66 performs the avoidance control, and the release means 615 releases the avoidance control.

Hereinafter, the description will be made about the release of the automatic control such as the collision avoidance. In the invention, there is a travel function in which a right/left turn at the intersection is automatically determined using a collision possibility determination of the invention in addition to a drive support function of assisting the driver's operation. Specifically, there is an example in which a travel path of the local vehicle 100 is set on the basis of a predetermined travel route, and the local vehicle 100 automatically travels on the basis of the path. In this case, according to the invention, a right/left turn is determined when making a right/left turn at the intersection. In a case where it is determined that a right turn is not possible, the local vehicle 100 is automatically stopped before making a right turn. In this way, the invention is able to be operated as the drive support for the driver and the control determination at the time of automatic traveling.

In the invention, the moving body and the obstacle around the local vehicle 100 are detected, the collision possibility determination is performed, and the drive support for the driver and the automatic traveling control are performed. At this time, it is considered that a driver is in the local vehicle 100 and the operation of the local vehicle 100 is performed by a driver's final determination. Therefore, in a case where the operation is performed by the driver's final determination, for example, the collision avoidance control is necessarily released on the basis of the right/left turn determination at the intersection as described in the embodiments of the invention and the driver's operation is performed with priority. The control is released by the release means 615 in the collision avoidance control means 66 of the vehicle control device 60 of the invention.

Figure 20:
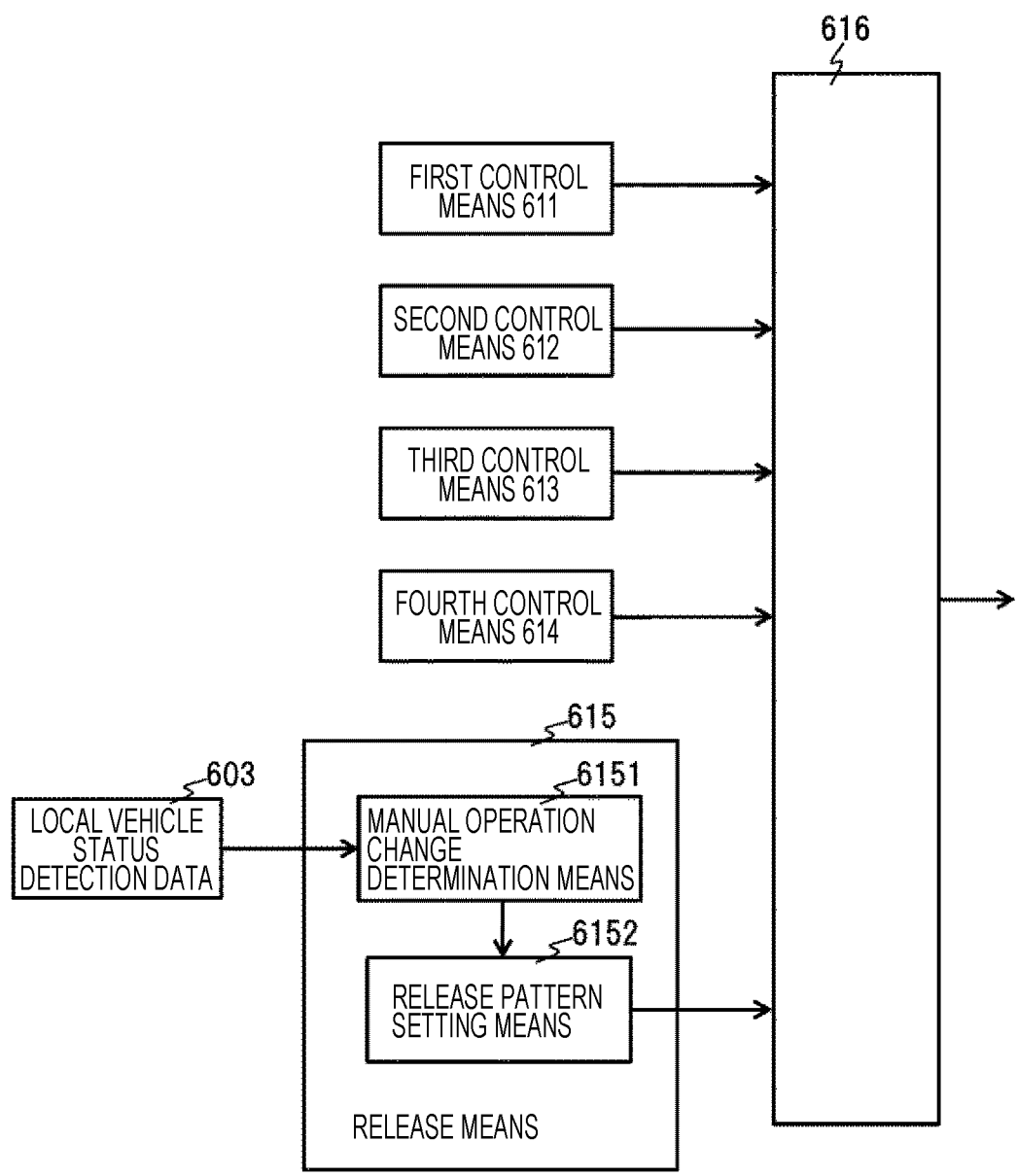
FIG. 20 is an explanatory diagram relating to a release means which releases a control command of the collision avoidance in the system for avoiding collision with the plurality of moving bodies according to the invention.

FIG. 20 illustrates a diagram illustrating a configuration of the release means 615. The release means 615 includes a manual operation change determination means 6151 and a release pattern setting means 6152. The manual operation change determination means 6151 detects whether the driver of the local vehicle 100 changes an operation of the local vehicle 100. Then, when the manual operation change determination means 6151 detects that the driver performs an operation, the control operation of the vehicle control device 60 is released on the basis of a release procedure set by the release pattern setting means 6152.

Herein, as a specific embodiment of the manual operation change determination means 6151, for example, there is a method in which an amount of change in steering angle, an amount of change in depressing brake pedal, an amount of change in accelerator opening, an amount of change in yaw rate, and an amount of change in lateral acceleration of the local vehicle 100 are detected. In a case where any one of these values becomes larger than a predetermined value set in advance, it is determined that the driver changes the operation of the local vehicle 100.

In addition, as a specific embodiment of the release pattern setting means 6152, for example, there is a method in which, when the manual operation change determination means 6151 determines that the driver changes the operation of the local vehicle 100, the control command of the vehicle control device 60 is released by taking a predetermined time. When the control command is released at once after the driver's operation is determined, the driver's operation and the operation of the automatic control are likely to be abruptly switched. Further, there may occur instability in the behavior of the local vehicle 100 by the abrupt switching in operation. Therefore, the control command of the vehicle control device 60 is released to be zero by taking a predetermined time. With this configuration, it is possible to smoothly switch the operation from the control operation to the driver's operation. However, when the switching time becomes long, the driver's operation is not performed with priority as much as that time. Therefore, it is desirable that the time for completely releasing the control command be set to be short. Furthermore, when the control command is released, there may be a method of freely setting a ratio of the control command together with the time instead of making the control command zero at a constant ratio.

Further, the embodiments of the invention have been described about the travel scene where the vehicle travels to the left side as a specific example. In a case where the vehicle travels to the right side, the same effects can be obtained. Specifically, in a case where the vehicle travels to the right side, the travel scene of a right turn in the embodiments of the invention corresponds to the travel scene of a left turn. In a case where the vehicle travels to the right side, the travel scene of a left turn in the embodiments of the invention corresponds to the travel scene of a right turn. While there is a difference between the right-side travel and the left-side travel of the vehicle, both travels can be handled substantially with the same manner.

REFERENCE SIGNS LIST

10 drive source
20 transmission
30 drive source control device
40 braking control device
50 communication device
60 vehicle control device
61 local vehicle position information processing means
62 road information processing means
63 external environment information processing means
64 local vehicle information processing means
65 right/left turn determination processing means
66 collision avoidance control means
67 operation amount calculation means
68 the display means
69 alarm means
70 control network
80 external environment recognition device
90 brake device
100 vehicle, local vehicle
110 right/left turn determination means
120 alarm device
130 display device
140 communication means
200 oncoming vehicle
300 pedestrian
400 light vehicle (bicycle)
500 oncoming vehicle
601 moving body detection data
602 road information acquisition data
603 local vehicle status detection data
604 first intersection time estimation means
605 second intersection time estimation means
606 first arrival time estimation means
607 second arrival time estimation means
608 predicted time comparison means
609 collision determination means
610 control select means
611 first control means
612 second control means
613 third control means
614 fourth control means
615 release means
616 select means

The invention claimed is:

1. An apparatus comprising:
a vehicle controller that is configured to
detect an external environment before a local vehicle intersects with a path of a first moving vehicle firstly intersecting with a travel path of the local vehicle,
when detecting at least two moving bodies, that is, the first moving vehicle and a pedestrian having a path in which a position intersecting with the travel path of the local vehicle is farther than a position where the path of the first moving vehicle intersects with the travel path of the local vehicle,
obtain a first predicted intersection time at which the first moving vehicle arrives at a first intersection position where the travel path of the local vehicle intersects with the path of the first moving vehicle, and a second predicted intersection time at which the pedestrian arrives at a second intersection position where the travel path of the local vehicle intersects with a path of the pedestrian,
a deceleration of the local vehicle is changeable by the vehicle controller, and
the vehicle controller changes the deceleration of the local vehicle based on a difference between the predicted second intersection time and the predicted first intersection time.

2. The apparatus according to claim 1, wherein when the second intersection time is larger than a value obtained by adding a predetermined margin time to the first intersection time, the vehicle controller outputs an alarm at a time when a position of the local vehicle is at a position ahead of the first intersection position.

3. The apparatus according to claim 1, wherein when the second intersection time is larger than a value obtained by adding a predetermined margin time to the first intersection time, the vehicle controller sets deceleration of the local vehicle at a position ahead of the first intersection position to be larger than that in case where the second intersection time is smaller than the value obtained by adding the predetermined margin time to the first intersection time.

4. The apparatus according to claim 3, wherein the predetermined margin time is equal to or more than a total sum of a movement time of the first moving vehicle at which the local vehicle detects a collision possibility with the first moving vehicle but it is safe even without deceleration when the local vehicle crosses in front of the traveling first moving vehicle, and a movement time of the pedestrian at which the pedestrian is not affected by the crossing local vehicle when the local vehicle crosses after the pedestrian travels.

5. The apparatus according to claim 3, wherein the predetermined margin time is set to 2 to 3 seconds.

6. The apparatus according to claim 1, wherein when the second intersection time is larger than a value obtained by adding a predetermined margin time to the first intersection time, the vehicle controller stops the local vehicle at a position ahead of the first intersection position.

7. The apparatus according to claim 1, wherein when the second intersection time is larger than a value obtained by adding a predetermined margin time to the first intersection time, the vehicle controller outputs an alarm when the local vehicle is at a position ahead of the first intersection position, and sets deceleration of the local vehicle at a position ahead of the first intersection position to be larger than that in a case where the second intersection time is smaller than the value obtained by adding the predetermined margin time to the first intersection time.

8. The apparatus according to claim 1, comprising: a manual operation change determination controller which detects whether a driver of the local vehicle changes an operation of the local vehicle, wherein, when the manual operation change determination controller detects that the driver changes the operation, a control operation of the vehicle controller is released.

9. The apparatus according to claim 1, comprising: a manual operation change determination controller which detects whether a driver of the local vehicle changes an operation of the local vehicle, wherein, when the manual operation change determination controller detects that the driver changes the operation, a control operation of the vehicle controller is released by a release pattern which is set by a release pattern setting controller.

10. The apparatus according to claim 9, wherein, in a case where any one of an amount of change in steering angle, an amount of change in depressing brake pedal, an amount of change in accelerator opening, an amount of change in yaw rate, and an amount of change in lateral acceleration of the local vehicle is larger than a predetermined value set in advance, the manual operation change determination controller determines that the driver changes the operation of the local vehicle.

11. The apparatus according to claim 10, wherein, when the manual operation change determination controller determines that the driver changes the operation of the local vehicle, the release pattern setting controller releases a control operation of the vehicle controller by taking a predetermined time.

* * * * *